United States Patent
Ryland et al.

(10) Patent No.: US 9,817,703 B1
(45) Date of Patent: Nov. 14, 2017

(54) DISTRIBUTED LOCK MANAGEMENT USING CONDITIONAL UPDATES TO A DISTRIBUTED KEY VALUE DATA STORE

(71) Applicant: Amazon Technologies, Inc., Reno, NV (US)

(72) Inventors: Mark Ryland, Great Falls, VA (US);
Alexander Slutsker, Seattle, WA (US);
David Craig Yanacek, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 429 days.

(21) Appl. No.: 14/096,948

(22) Filed: Dec. 4, 2013

(51) Int. Cl.
G06F 12/00 (2006.01)
G06F 12/14 (2006.01)
G06F 17/00 (2006.01)
G06F 7/00 (2006.01)
G06F 9/52 (2006.01)

(52) U.S. Cl.
CPC .................... G06F 9/524 (2013.01)

(58) Field of Classification Search
CPC ............... G06F 17/30362; G06F 9/526; G06F 17/30371; G06F 17/30171; G06F 17/30008
USPC ........................... 710/200; 707/704, E17.007
See application file for complete search history.

(56) References Cited

U.S. PATENT DOCUMENTS

| | | | |
|---|---|---|---|
| 5,212,788 A * | 5/1993 | Lomet | G06F 17/30309 |
| 5,265,245 A * | 11/1993 | Nordstrom | G06F 9/52 |
| 5,590,276 A * | 12/1996 | Andrews | G06F 11/1441 714/6.21 |
| 5,913,213 A * | 6/1999 | Wikstrom | G06F 9/52 707/610 |
| 5,987,550 A * | 11/1999 | Shagam | G06F 13/1652 710/108 |
| 6,105,099 A * | 8/2000 | Freitas | G06F 9/52 370/231 |
| 6,658,513 B1 * | 12/2003 | Bonnie | G06F 9/52 707/E17.007 |

(Continued)

OTHER PUBLICATIONS

The Apache Software Foundation, "ZooKeeper Recipes and Solutions", Oct. 9, 2013, pp. 1-8.

(Continued)

*Primary Examiner* — Faisal M Zaman
(74) *Attorney, Agent, or Firm* — Robert C. Kowert; Meyertons, Hood, Kivlin, Kowert & Goetzel, P.C.

(57) ABSTRACT

A compute cluster including multiple compute nodes may implement distributed lock management using conditional updates to a distributed key value data store. It may be determined, at one or more compute nodes of a compute cluster, that particular lock is available based on a respective lock entry for the particular lock maintained in a lock manager table at a key value data store. The key value data store may be configured to perform conditional write requests for updates to data store at the key value, and may maintain data according to a distributed durability scheme. Compute nodes that determine that a lock is available may send a conditional write request to the key value data store in order to acquire the particular lock. The compute node that acquired the particular lock may be identified based on the successfully completed conditional write request to the respective lock entry.

18 Claims, 20 Drawing Sheets

(56) References Cited

U.S. PATENT DOCUMENTS

| | | | |
|---|---|---|---|
| 6,681,225 B1* | 1/2004 | Uceda-Sosa | G06F 9/526 |
| 6,920,454 B1* | 7/2005 | Chan | G06F 9/5061 |
| 7,167,969 B2* | 1/2007 | Griffin | G06F 12/1441 |
| | | | 710/200 |
| 7,320,085 B2* | 1/2008 | Bain | G06F 9/52 |
| | | | 710/200 |
| 7,870,239 B1* | 1/2011 | Kaufman | G06F 17/30171 |
| | | | 709/223 |
| 8,589,550 B1* | 11/2013 | Faibish | G06F 3/067 |
| | | | 707/E17.01 |
| 8,719,432 B1* | 5/2014 | Vermeulen | G06F 9/526 |
| | | | 707/704 |
| 9,171,019 B1* | 10/2015 | Donlan | G06F 17/30362 |
| 2002/0052959 A1* | 5/2002 | Freitas | G06F 9/526 |
| | | | 709/226 |
| 2002/0087769 A1* | 7/2002 | McKenney | G06F 9/52 |
| | | | 710/200 |
| 2002/0199113 A1* | 12/2002 | Pfister | G06F 9/526 |
| | | | 718/100 |
| 2003/0033487 A1* | 2/2003 | Pfister | G06F 12/0817 |
| | | | 711/144 |
| 2003/0217119 A1* | 11/2003 | Raman | H04L 67/1095 |
| | | | 709/219 |
| 2003/0221071 A1* | 11/2003 | McKenney | G06F 9/526 |
| | | | 711/152 |
| 2006/0005197 A1* | 1/2006 | Saha | G06F 9/30021 |
| | | | 718/104 |
| 2006/0123004 A1* | 6/2006 | Rapp | G06F 17/30362 |
| 2006/0259907 A1* | 11/2006 | Bhatia | G06F 9/526 |
| | | | 718/104 |
| 2008/0270722 A1* | 10/2008 | Liu | G06F 9/526 |
| | | | 711/162 |
| 2009/0254555 A1* | 10/2009 | Balakrishnan | G06F 9/455 |
| 2011/0125974 A1* | 5/2011 | Anderson | G06F 12/084 |
| | | | 711/153 |
| 2012/0304185 A1* | 11/2012 | Horikawa | G06F 9/526 |
| | | | 718/102 |

OTHER PUBLICATIONS

Google Inc., "The Chubby Lock Service for Loosely-coupled Distributed Systems", Mike Burrows, Nov. 2006, pp. 335-350.
ACM Transactions on Computer Systems, "The Part-Time Parliament", Leslie Lamport, May 1998, pp. 1-33.
My Writings, "The Part-Time Parliament", Leslie Lamport, May 1998, last modified Dec. 11, 2013, pp. 1-3.
"Paxos Made Moderately Complex", Robbert van Renesse, Mar. 25, 2011, pp. 1-15.

* cited by examiner

DISTRIBUTED LOCK MANAGEMENT USING CONDITIONAL UPDATES TO A DISTRIBUTED KEY VALUE DATA STORE

BACKGROUND

Distributed applications, by nature of being distributed, may divide up tasks, problems, or operations among different distributed components of a distributed system. Such distribution offers several advantages. Complex or computing resource intensive tasks may be divided up among multiple low-end computing systems, instead of relying upon a more expensive, monolithic system. The number of computing systems that make up a distributed system for distributed application may be more easily scaled up or down to reflect changing needs for distributed applications. Distributed systems may also be beneficial when the nature of the tasks performed by an operation, such as where data is generated in one location, and process, stored, or analyzed in another, are physically distributed.

The advantages afforded by dividing up operations, tasks, or problems in distributed applications may be blunted by the complications distributed applications can create. Consistency among distributed system components, for instance, may be necessary in order to correctly perform a given task. Techniques for consistency have been achieved in different ways. Some distributed systems opt for a synchronous communication model, where all distributed components are brought to the same point of agreement before making progress in an operation. While other distributed systems implement asynchronous communication models, which may allow for different distributed system components to make progress in performing an operation at different states, as long as consistency may be eventually be achieved. For certain types of distributed applications operating in unreliable communication environments, asynchronous communication may offer a more dependable way to perform distributed operations.

Various solutions and techniques for maintaining consistency in a distributed system implementing asynchronous distributed applications while still making progress have been developed. As distributed applications grow in popularity, such as in response to greater numbers of computing systems capable of communicating over a network like the Internet, providing access to many different computing services, the efficiency and accessibility of implementing of these solutions and techniques becomes more important. However, such techniques are often complex and, thus, difficult to implement without relevant expertise, increasing the demand for less complicated and more accessible consistency solutions in order to implement distributed applications.

Figure 1:
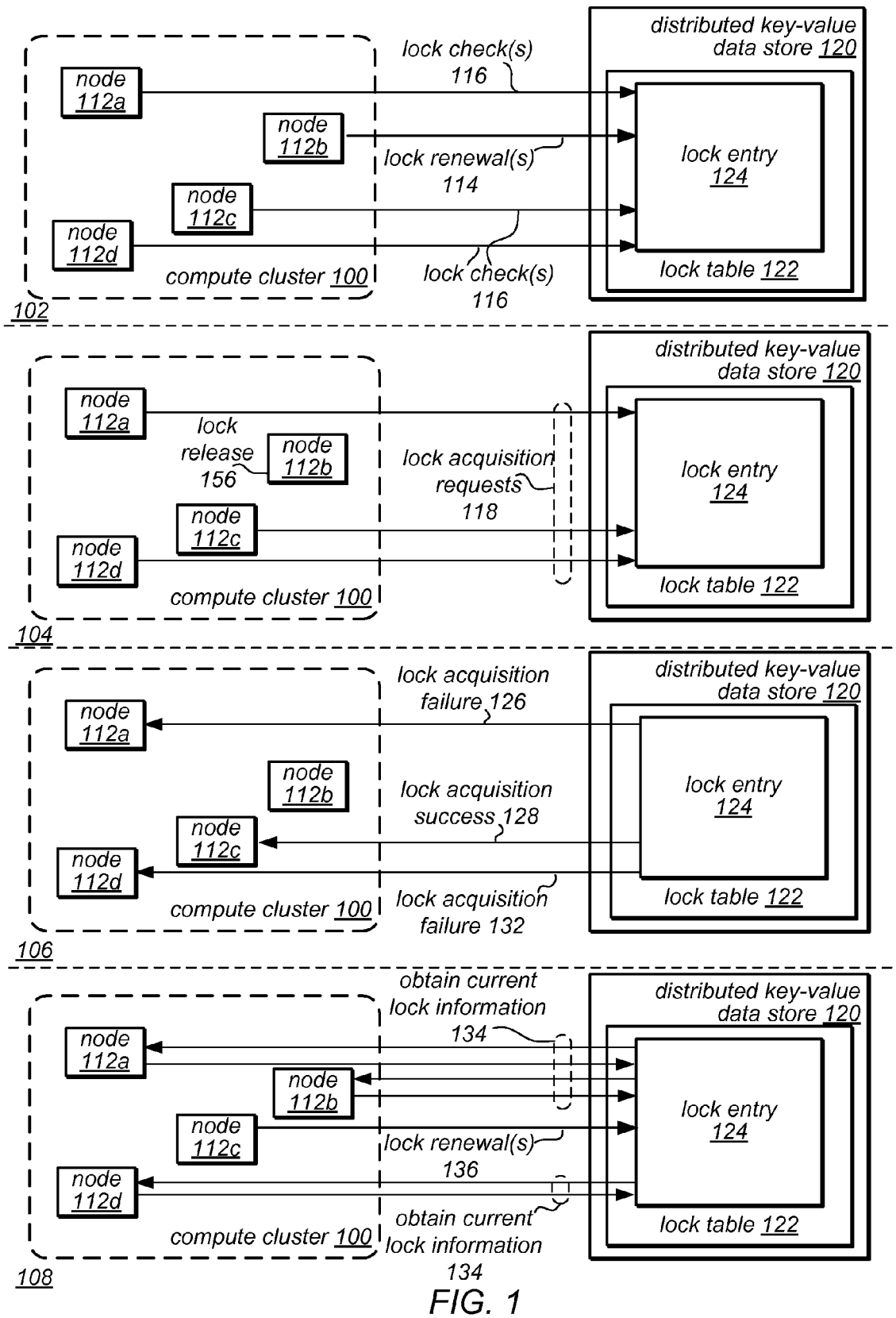
FIG. 1 is series of block diagrams illustrating a distributed lock manager using conditional updates to a distributed key value data store, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement distributed lock management using a distributed key value data store. Distributed applications or systems, may be configured to divide tasks, operations, or problems among multiple components in a distributed system (referred herein as "nodes"). For example, in various embodiments, a distributed system may be implemented as a compute cluster made up of multiple compute nodes. The compute cluster may divide work among the multiple compute nodes. Consistency for the compute cluster may be provided by implementing distributed lock management at the compute cluster, which may allow different compute nodes in the compute cluster to acquire locks indicating a right to exclusively perform particular roles, tasks, or other portions of work, such as updating a particular portion of data.

In various embodiments, locks may be acquired at a compute cluster implementing distributed lock management by performing conditional updates to acquire a corresponding lock entry in a lock manager table maintained in a distributed key value data store. A conditional update may be performed atomically at the key value data store, either performed or not performed. If, for instance, two compute nodes send a conditional update to acquire the same lock at the distributed key value data store, then only one update from a particular compute node to acquire the lock may succeed and, importantly, the other node may receive a distinguished ("you lost the race") error message such that it may take an appropriate action. A distributed key value data store may be highly-available, providing a data storage service according to a distributed durability scheme. A distributed key value data store may also provide read-after-write consistency, such that writes to data in the data store may be immediately available (or appear immediately available from a reader's perspective) for reading. Thus, a read request for data that has been modified by a write request may not respond with out-of-date or stale data, but with the modified data. In at least some embodiments, distributed lock management may be implemented at the compute cluster without implementing a Paxos-based technique at the compute cluster.

Typically, consistency mechanisms that provide locks to distributed systems, such as a compute cluster, may rely upon complex consistency algorithms or protocols that are difficult to implement. Paxos, for example, is a consensus solving protocol that allows a number of nodes to determine a one result for a distributed process performed among a group of nodes participating in the distributed process. Consistency mechanisms, such as Paxos, often involve multiple phases of requests and responses between different nodes performing different roles for each of the phases in order to achieve consensus. For example, in order to acquire a lock using a Paxos technique, a compute node may have to send a lock request to multiple different acceptor nodes, which must first acknowledge a request to prepare to acquire the lock and positively respond. Then, a lock acquisition request may be sent to the same acceptors, which upon acceptance may finally send a response back acknowledging successful acquisition of the lock. As Paxos, and other similar techniques, involve multiple rounds of requests and responses in order to maintain consensus, consistency mechanisms such as locking that rely on these techniques may be less efficient. For example, some distributed lock managers or lock services implementing these techniques may only provide coarse-grained locking (where locks are held for longer duration, such as for hours or days), as opposed to fine-grained locking where locks may be held for a shorter duration.

FIG. 1 is a series of block diagrams illustrating a distributed lock manager using conditional updates to a distributed key value data store, according to some embodiments. A compute cluster 100 including multiple compute nodes 112 may communicate with a distributed key-value data store 120. Lock acquisition requests 118 for available locks, as well as lock renewals 114 may be performed with respect to lock entries, such as lock entry 124, in lock table 122 maintained at distributed key value data store 120.

As indicated at scene 102, compute cluster 100 implements multiple compute nodes 112a, 112b, 112c, and 112d. These compute nodes may be one or more computing devices, virtualized compute instances, or any other computing system or devices, such as discussed below with regard to FIG. 14. Nodes 112 may perform various distributed operations as part of compute cluster 100, such as data analysis, computation, simulation, or any other type of operation, problem, or task as part of a distributed application. Various messages, information, as well as other interactions may be shared between nodes 112 in compute cluster 100 as part of implementing a distributed application.

In various embodiments, compute cluster 100 may implement a distributed lock manager. A distributed lock manager module, client, or other type of component may be implemented on each of nodes 112 in order to provide distributed lock management for compute cluster 100. In at least some embodiments, distributed lock manager may be a library, package, application, or other component that may be downloaded to or implemented as part of a distributed application implemented at a compute cluster. In at least some embodiments, a distributed lock manager may be configured to communicate directly with distributed key value data store 120 in order to provide distributed lock management, implemented as part of a kernel or other software platform on top of which distributed applications may be performed at compute nodes 112.

Nodes 112 of compute cluster 100 may be configured to communicate with distributed key value data store 120. Distributed key-value data store 120 may be a highly-available data store, such as may be implemented using a distributed durability scheme. A distributed durability scheme may provide redundancy, replication, fault tolerance, or some other guarantee of maintaining a consistent state of data for clients of the distributed key-value data store among multiple nodes of the distributed key value data store in order to maintain availability of storage services. In at least some embodiments, distributed key value data store 120 may implement a consensus technique such as Paxos-based technique as part of a distribute durability scheme. For example, in some embodiments distributed key value data store 120 may be implemented by a storage cluster including a leader node and multiple storage nodes. In the event of a failure of the leader node, a leader failover mechanism provided by the distributed durability scheme may elect a new leader node from among the multiple storage nodes according to a different distributed lock manager that is accessible to key value data store 120 (for which the storage node that acquires the leader lock may be elected the new leader node). In some embodiments, this different distributed lock manager (which may be separate from the distributed lock manager implemented at compute cluster 100) may be implemented according to a Paxos-based technique. However distributed key value data store 120 maintains highly available data, clients of distributed key value data store 120, such as compute cluster 100, may not be aware of the underlying distributed durability scheme, such as the Paxos-based scheme implementing a different distributed lock manager, nor have to interact directly with the underlying distributed durability scheme in order to implement distributed lock management at compute cluster 100.

In the illustrated scene 102, node 112b is illustrated as the current possessor of a lock. Lock entry 124 in lock table 122 for the respective lock held by node 112b may, in some embodiments, include various descriptive information about the current holder of the lock, such as the identity of node 112b, data or information about the lock (e.g., lock type), lease or duration of the lock, a lock version or other indicator used for determining the lock's availability/validity/released status. In at least some embodiments, node 112*b* may send lock renewals 114 to the key value data store 120 in order to update lock entry 124. These lock renewals may be sent periodically or aperiodically. In some embodiments, lock renewals 114 may include a unique entry, such as a globally unique identifier, or a monotonically increasing identifier to be stored as part of lock entry 124.

Figure 11:
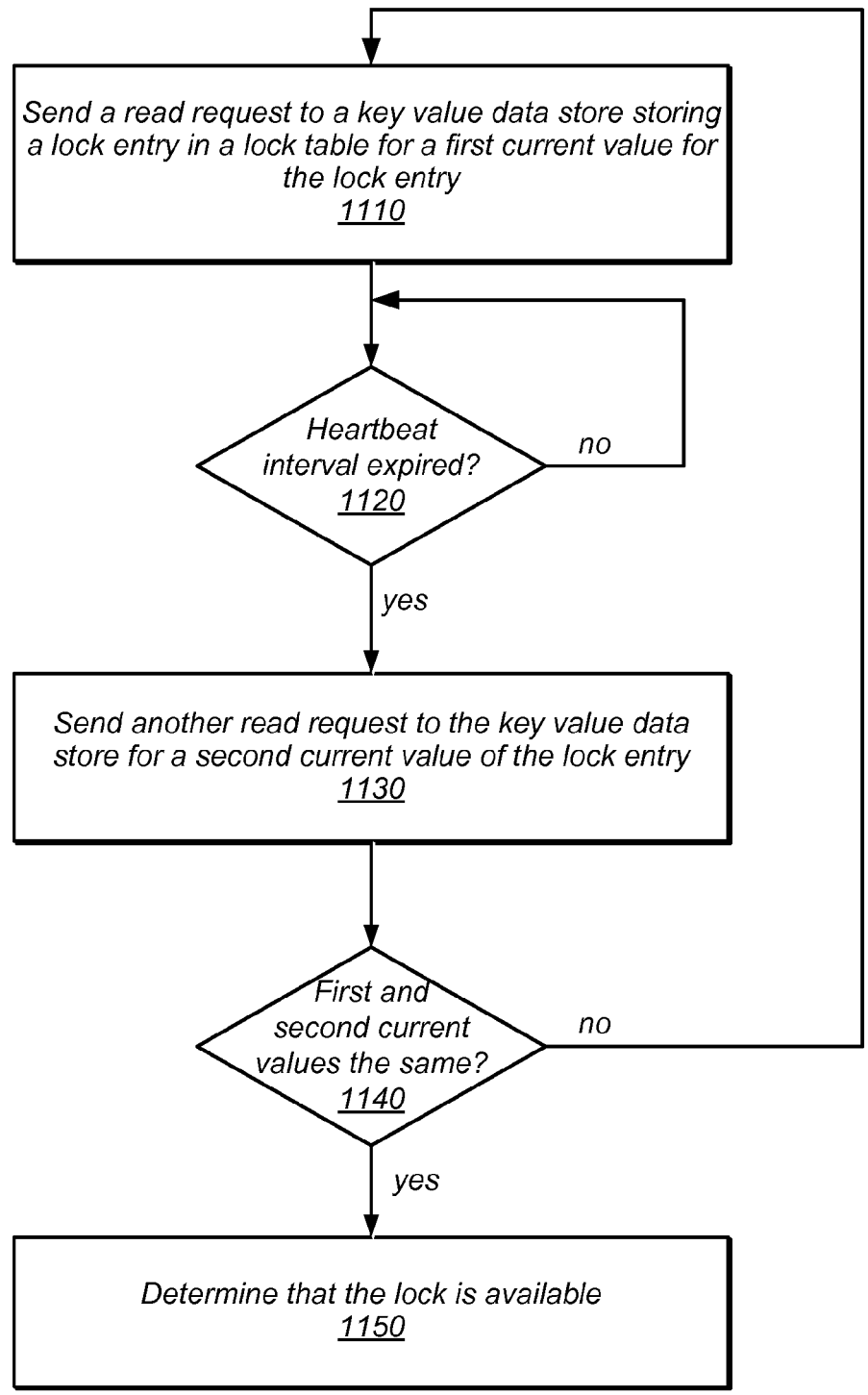
FIG. 11 is a high-level flowchart illustrating a method for determining whether a particular lock is available, according to some embodiments.

Other nodes in compute cluster 100, such as nodes 112*a*, 112*b*, and 112*d* may perform lock checks 116 by sending read requests to lock entry 124. These lock checks may be used to determine whether a particular lock is, or is not, available. FIG. 11, described in more detail below, provides examples of determining whether a lock is available based on values read from a lock entry. In the example illustrated in FIG. 1, lock checks 116 may be used to determine whether node 112*b* is still renewing its lock. In at least some embodiments, lock checks 116 may be performed as part of a polling technique to check lock entry 124 for availability. Lock checks may be performed continuously, in response to certain events, and/or otherwise periodically or aperiodically.

Scene 104 illustrates the scenario where node 112 has ceased sending lock renewals, resulting in a release of the lock 156. A lock may be released for a variety of reasons. For example, node 112*b* may have completed a task that may have required a lock in order to preserve the exclusivity of node 112*b*'s right to perform the task, such as the right to update or modify particular data. In another example node 112*b* may have failed, stalled, or locked up, and may be unable to continue operating as before. For those compute nodes such as 112*a*, 112*b*, and 112*d* performing lock checks 116, the availability of the lock held by node 112*b* may be determined. For example, in some embodiments, a lock check 116 may be sent for a first value of lock entry 124 returned (or part of lock entry 124). After the expiration of a heartbeat interval (or some other lease duration, timeout, or other period of time, such as may be related to the expected time with which node 112*b* previously issued lock renewals 114), another lock check 116 may be sent for a second value of a lock entry 124. If the two lock entry values 124 are the same (or specific parts of the two lock entries are the same), then the lock may be determined to be available (as node 112*b* would have renewed the lock entry with a unique value that is different from previous values stored in lock entry 124).

For those lock nodes that determine that a particular lock is available, lock acquisition requests 118 may be sent to distributed key value data store 120 in order to acquire the available lock. In various embodiments, lock acquisition requests are conditional write requests, which may be sent to update lock entry 124 with information indicating that the sending compute node, such as 112*a*, 112*b*, and 112*d*, is the current lock holder. A conditional write request may, in various embodiments, be atomically performed. For example, in some embodiments, a conditional write request may be sent to distributed key value data store 120. It may then be determined that lock entry 124 in lock table 122 is not currently being written. The requested write may then be performed to update lock entry 124 such that no other intervening write requests may be (or have been) performed. For example, in some embodiments, a conditional write request may include the current value of a lock entry, as well as new value to replace the current value. If, when received at the distributed key value data store, the current value is not correct, then it may be determined that an intervening write has been performed (and thus the conditional write request may fail to complete successfully). Though multiple actions may be taken to perform the write request, from the perspective of the sending compute node, the conditional write request may be atomic, either performed or not performed. For those write requests that are received at distributed key value data store 120 to update lock entry 124 in lock table 122 that would intervene in a current write operation, or are directed to update a lock entry that is no longer the same as when the conditional write request was first issued (e.g., the write request arrived after another write request for lock entry 124 was received and/or completed), the conditional write request may be failed, rejected, and/or otherwise sent back.

Scene 106 illustrates various response messages from distributed key value data store 120 to compute nodes 112*a*, 112*c*, and 112*d*. Node 112*c*, for instance, receives lock acquisition success 128, which may indicate that the conditional write request sent to distributed key value data store as part of lock acquisition request 118, completed successfully. Thus, in some embodiments, lock entry 124 may now identify node 112*c* as possessor of the respective lock for lock entry 124. Node 112*c* may begin to perform lock renewals 136 as discussed above. Node 112*a* may receive lock acquisition failure 126, which may indicate that the conditional write request as part of the lock acquisition request 118 failed to complete. Similarly, node 112*d* may receive lock acquisition failure 132, indicating that the conditional write request as part of lock acquisition request 118 failed to complete.

In some embodiments, nodes 112 of compute cluster 100 may wish to determine the current holder of a lock, or other information about the lock, for performing various operations or tasks as part of compute cluster 100. For example, in some embodiments, lock entry 124 may indicate a current leader node for compute cluster 100, which may interact with other compute nodes of compute cluster 100. A compute node may wish to obtain the identity of a new leader (for which obtaining the leader lock entry served as election to the leader node position for the compute cluster. Thus nodes, such as nodes 112*a*, 112*b*, and 112*d* may send read requests to lock entry 124 in distributed key value data store 120 and receive responses in order to obtain current lock information 134.

Please note that previous descriptions are not intended to be limiting, but are merely provided as an example of distributed lock management using conditional updates to a key value data store. For example, lock table 122 may include multiple lock entries for compute cluster 100, each of which may change possessors, become available, be deleted, created, etc. independent of other locks. Distributed key value data store may be configured to process large amounts of incoming traffic to lock table 122, and thus may be configured to provide both coarse and fine-grained locking capabilities for compute cluster 100. Other differences, such as the number of compute nodes, the number of nodes requesting or releasing a lock may also be different than illustrated in FIG. 1.

This specification begins with a general description distributed key value data store and a computational service, which may implement one or more compute clusters that implement distributed lock management using conditional updates to the distributed key value data store. Then various examples of a compute cluster that implements distributed lock management are discussed, including different components/modules, or arrangements of components/module that may be employed as part of implementing a distributed key value data store, compute cluster and/or distributed lock management module. A number of different methods and techniques to implement distributed lock management using conditional updates to a distributed key value data store are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
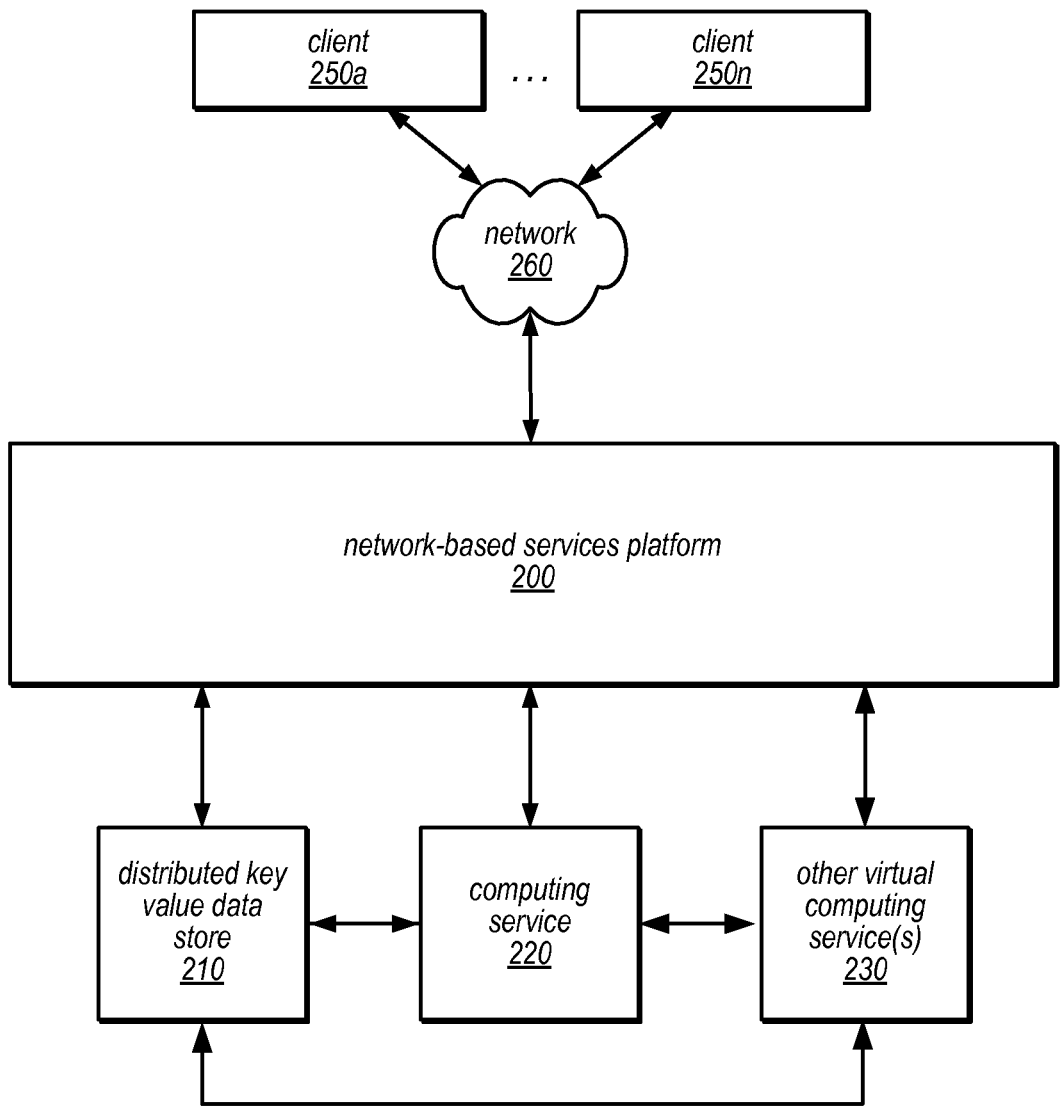
FIG. 2 is a block diagram illustration of an operating environment for network-based services, according to some embodiments.

FIG. 2 is a block diagram illustration of an operating environment for network-based services, according to some embodiments. Compute clusters, as discussed above in FIG. 1, implementing distributed lock management may be implemented as part of computing service 220, and may be configured to communicate with distributed key value data store 210 as part of network-based services platform 200. Computing service 220 and distributed key value data store 210 may also be configured to interact with other systems, components or entities, such as other virtual computing services 230 and/or clients 250.

In various embodiments, a number of clients (shown as clients 250a-250n) may be configured to interact with a network-based services platform 200 via a network 260. Network-based services platform 200 may be configured to interface with one or more instances of a distributed key value data store 210, computing service 220, and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 14 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one key value data store component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a computational client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a computational client) may be configured to provide access to network-based services, such as computing service 220, distributed key value data store 210, and/or other virtual computing services 230 in a manner that is transparent to those applications. For example, client 250 may be configured to interact with a compute cluster implemented as part of computing service 220. This compute cluster may implement distribute lock management in order to provide locks to the compute cluster for performing consistent distributed operations, and send conditional write requests to distributed key value data store 210 as part of implementing distributed lock management. In such an embodiment, applications may not need to be modified to make use of the service model of FIG. 2. Instead, the details of interfacing to network-based services platform 200 may be coordinated by client 250 and the operating system or file system on behalf of applications executing within the operating system environment at a client 250.

Clients 250 may convey network-based services requests (e.g., data access request) to and receive responses from network-based services platform 200 via network 260. In various embodiments, network 260 may encompass any suitable combination of networking hardware and protocols necessary to establish network-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a data service system (e.g., a system that implements distributed key value data store 210 and/or computing service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements distributed key value data store 210, computing service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data (such as database tables or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of distributed key value data store 210 and computing service 220 operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of distributed key value data store 210, computing service 220 and/or another virtual computing service 230 (or the underlying systems that implement those services).

In some embodiments, network-based services platform 200 may also implement user authentication and access control procedures. For example, for a given network-based services request to access a particular portion of data, such as a particular compute cluster, platform 200 may be configured to ascertain whether the client 250 associated with the request is authorized to access the particular compute cluster. Platform 200 may determine such authorization by, for example, evaluating an identity, password or other credential against credentials associated with the particular database, or evaluating the requested access to the particular database against an access control list for the particular data. For example, if a client 250 does not have sufficient credentials to access the particular compute cluster, platform 200 may reject the corresponding network-based services request, for example by returning a response to the requesting client 250 indicating an error condition. Various access control policies may be stored as records or lists of access control information by distributed key value data store 210, computing service 220 and/or other virtual computing services 230.

It is noted that while network-based services platform 200 may represent the primary interface through which clients 250 may access the features of computing service 220, it need not represent the sole interface to such features. For example, an alternate API that may be distinct from a network-based services interface may be used to allow clients internal to the enterprise providing the computing service to bypass network-based services platform 200. Note that in many of the examples described herein, distributed key value data store 210 may be internal to a computing system or an enterprise system that provides computing services to clients 250, and may not be exposed to external clients (e.g., users or client applications). In such embodiments, the internal "client" (e.g., computing service 220) may access distributed key value data store 210 over a local or private network, shown as the solid line between computing service 220 and distributed key value data store 210 (e.g., through an API directly between the systems that implement these services). In such embodiments, the use of distributed key value data store 210 in storing data on behalf of clients 250 may be transparent to those clients. In other embodiments, distributed key value data store 210 may be exposed to clients 250 through network-based services platform 200. In some embodiments, clients of the computing service 220 may access computing service 220 via network 260 (e.g., over the Internet). In some embodiments, other virtual computing services 230 may be configured to receive requests from computing service 220 (e.g., through an API directly between the virtual computing service 230 and computing service 220) to perform various other computing services 230 on behalf of a client 250. In some cases, the accounting and/or credentialing services of platform 200 may be unnecessary for internal clients such as administrative clients or between service components within the same enterprise.

Figure 3:
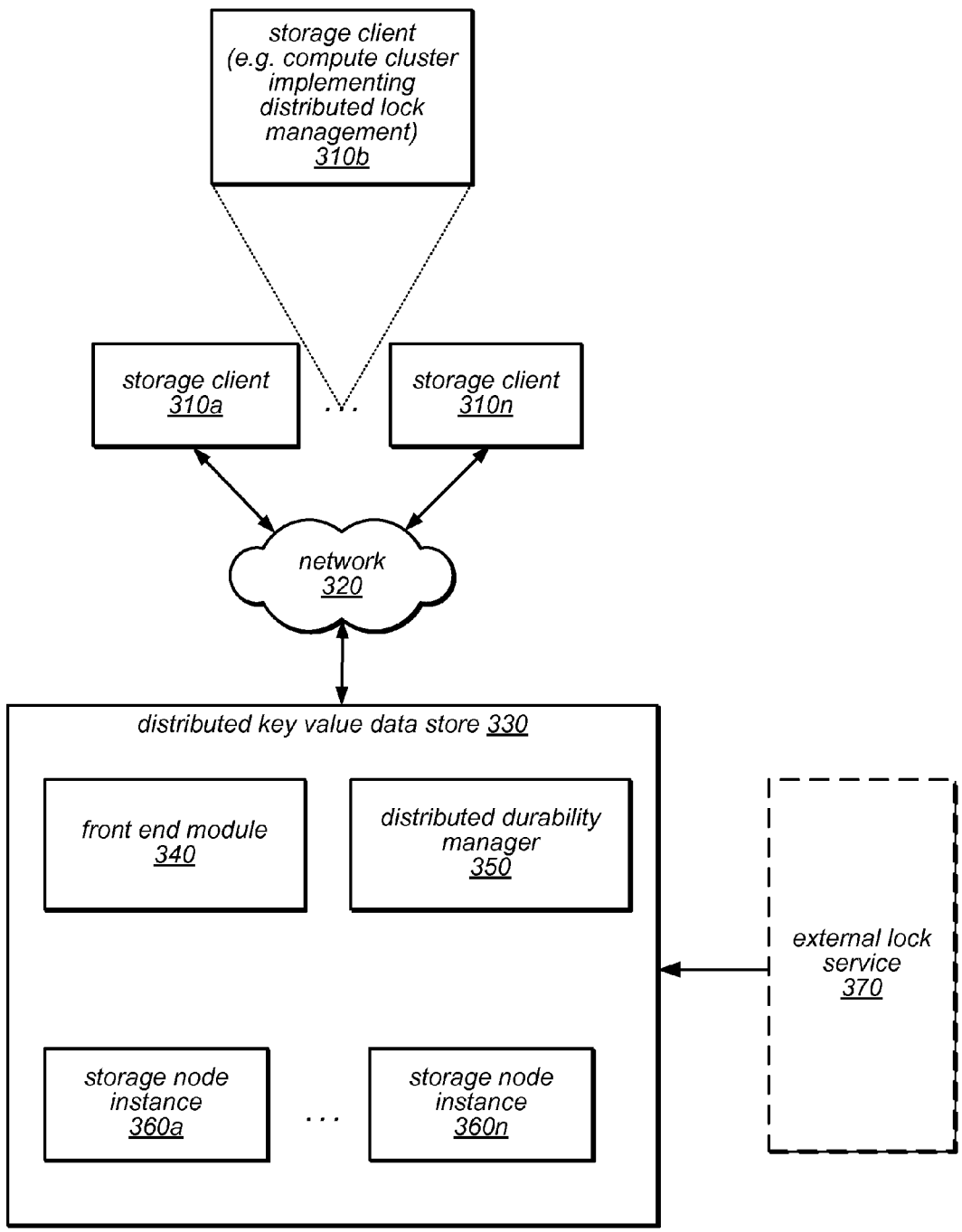
FIG. 3 is a block diagram illustrating a distributed key value data store, according to some embodiments.

FIG. 3 is a block diagram illustrating a distributed key value data store, according to some embodiments. It is noted that where one or more instances of a given component may exist, reference to that component herein below may be made in either the singular or the plural. However, usage of either form is not intended to preclude the other. In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a distributed system including a number of computing nodes (or simply, nodes), such as computing system 2000 in FIG. 14 described below. In various embodiments, the functionality of a given storage service system component may be implemented by a particular computing node or may be distributed across several computing nodes. In some embodiments, a given computing node may implement the functionality of more than one storage service system component.

Generally speaking, storage clients 310*a*-310*n* may encompass any type of client configurable to submit web services requests to distributed key value data store 330 via network 320, similar to clients 250 described above. For example, a given storage service client 310 may include a suitable version of a web browser, or a plug-in module or other type of code module configured to execute as an extension to or within an execution environment provided by a web browser to provide database or data storage service clients (e.g., client applications, users, and/or subscribers) access to the services provided by distributed key value data store 330. Alternatively, a storage client 310 may encompass an application such as a database application, media application, office application or any other application that may make use of persistent storage resources. In various embodiments, a storage client, such as storage client 310*b* may be compute nodes of a compute cluster implementing a distributed lock manager module/application such as discussed below with regard to FIGS. 5-13). In some embodiments, such an application may include sufficient protocol support (e.g., for a suitable version of Hypertext Transfer Protocol (HTTP)) for generating and processing web services requests without necessarily implementing full browser support for all types of web-based data. That is, storage client 310 may be an application configured to interact directly with distributed key value store 330. In various embodiments, storage client 310 may be configured to generate web services requests according to a Representational State Transfer (REST)-style web services architecture, a document- or message-based web services architecture, or another suitable web services architecture.

Storage clients 310 may convey web services requests to and receive responses from distributed key value data store 330 via network 320. In various embodiments, network 320 may encompass any suitable combination of networking hardware and protocols necessary to establish web-based communications between clients 310 and network-based storage service 330. For example, network 320 may generally encompass the various telecommunications networks and service providers that collectively implement the Internet. Network 320 may also include private networks such as local area networks (LANs) or wide area networks (WANs) as well as public or private wireless networks. For example, both a given client 310 and distributed key value data store 330 may be respectively provisioned within enterprises having their own internal networks. In such an embodiment, network 320 may include the hardware (e.g., modems, routers, switches, load balancers, proxy servers, etc.) and software (e.g., protocol stacks, accounting software, firewall/security software, etc.) necessary to establish a networking link between given client 310 and the Internet as well as between the Internet and network-based storage service 330. It is noted that in some embodiments, storage clients 310 may communicate with distributed key value data store 330 using a private network rather than the public Internet. For example, clients 310 may be provisioned within the same enterprise as the data storage service (and/or the underlying system) described herein. In such a case, clients 310 may communicate with distributed key value data store 330 entirely through a private network 320 (e.g., a LAN or WAN that may use Internet-based communication protocols but which is not publicly accessible).

Generally speaking, distributed key value data store 330 may be configured to implement one or more service endpoints configured to receive and process web services requests, such as requests to access tables maintained on behalf of clients/users by a database service or a data storage service, and/or the items and attributes stored in those tables. For example, distributed key value data store 330 may include hardware and/or software configured to implement various service endpoints and to properly receive and process HTTP-based web services requests directed to those endpoints. In one embodiment, distributed key value data store 330 may be implemented as a server system configured to receive web services requests from clients 310 and to forward them to various components that collectively implement a data storage system for processing. In other embodiments, distributed key value data store 330 may be configured as a number of distinct systems (e.g., in a cluster topology) implementing load balancing and other request management features configured to dynamically manage large-scale web services request processing loads.

As illustrated in FIG. 3, distributed key value data store 330 may include a front end module 340 (which may be configured to receive, authenticate, parse, throttle and/or dispatch service requests, among other things) as well as implement one or more administrative components (which may be configured to provide a variety of visibility and/or control functions, as described in more detail herein), a distributed durability manager 350 which may provide various mechanisms to maintain data at the distributed key value data store 330 according to a distributed durability scheme, and a plurality of storage node instances (shown as 360*a*-360*n*), each of which may maintain and manage one or more tables on behalf of clients/users or on behalf of the data storage service (and its underlying system) itself. Some of the functionality provided by each of these types of components is described in more detail herein, according to various embodiments. Note that in some embodiments, distributed key value data store 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 3. Note also that in various embodiments, one or more database instances may be implemented on each of the storage nodes 360*a*-360*n*, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

Front end module 340 may include one or more modules configured to perform parsing and/or throttling of service requests, authentication and/or metering of service requests, dispatching service requests, and/or maintaining a partition map cache. In addition to these component-specific modules, front end module 340 may include components that are common to multiple types of computing nodes that collectively implement network-based services platform 200, such as a message bus and/or a dynamic configuration module. In other embodiments, more, fewer, or different elements may be included in front end module 340, or any of the elements illustrated as being included in front end module 340 may be included in another component of distributed key value data store 330 or in a component configured to interact with distributed key value data store 330 to provide the data storage services described herein.

Front end service module 340 may also include various administrative components (though they may also be implemented in separate module as well). These may include one or more modules configured to provide visibility and control to system administrators, or to perform heat balancing, and/or anomaly control, and/or resource allocation. Front end module 340 may also include an admin console, through which system administrators may interact with key value data store (and/or the underlying system). In some embodiments, admin console may be the primary point of visibility and control for the key value data store (e.g., for configuration or reconfiguration by system administrators). For example, admin console may be implemented as a relatively thin client that provides display and control functionally to system administrators and/or other privileged users, and through which system status indicators, metadata, and/or operating parameters may be observed and/or updated.

Distributed durability manager 350 may employ various different distributed durability schemes to provide redundancy, availability, durability, and/or performance guarantees for distributed key value data store 330. For example, distributed durability manager may initiate and/or facilitate leader node failover operations, in the event of a failure of the leader node in a cluster of storage nodes 360. Distributed durability manager 350 may provide a lock service for leader node elections, or other operations among storage nodes 360. This lock service may be based on different consensus techniques, such as a Paxos-based technique. In some embodiments, distributed durability manager 350 may provide an interface to an external lock service 370, such as another virtual computing service 230 illustrated above in FIG. 2, which may provide similar locking capabilities for implementing various distributed durability schemes. External lock service 370 may also implement various consensus techniques such as a Paxos-based technique.

Storage node instances 360 may include one or more modules configured to provide partition management, to implement replication and failover processes (which may also be managed by distributed durability manage 350), and/or to provide an application programming interface (API) to underlying storage. Various different ones of control plane operations may be performed locally (e.g., on a given storage node instance 360) based, e.g., on one or more measures of the utilization of provisioned resources on the storage devices or logical storage volumes of the storage node instance.

As noted above, different storage nodes 360 may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a leader node, performing special functions with regard to access requests directed toward the partition maintained by replica group 1. For replica group 2, however, storage node B may be the leader node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

As illustrated in this example, each storage node instance 360 may include a storage engine, which may be configured to maintain (i.e. to store and manage) one or more tables, such as a lock manager table for a compute cluster, (and associated table data) in storage (which in some embodiments may be a non-relational database) on behalf of one or more clients/users. In addition to these component-specific modules, storage node instance 360 may include components that are common to the different types of computing nodes that collectively implement distributed key value data store 330, such as a message bus and/or a dynamic configuration module. In other embodiments, more, fewer, or different elements may be included in storage node instance 360, or any of the elements illustrated as being included in storage node instance 360 may be included in another component of network-based storage service 330 or in a component configured to interact with network-based storage service 330 to provide the data storage services described herein.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

In various embodiments, distributed key value data store 330 may be configured to support different types of web services requests. For example, in some embodiments, network-based storage service 330 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In various embodiments, the data storage service described herein may provide an application programming interface (API) that includes support for some or all of the following operations on the data in a table maintained by the service on behalf of a storage client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request. In various embodiments, the API may support conditional write requests as part of put requests.

Figure 4:
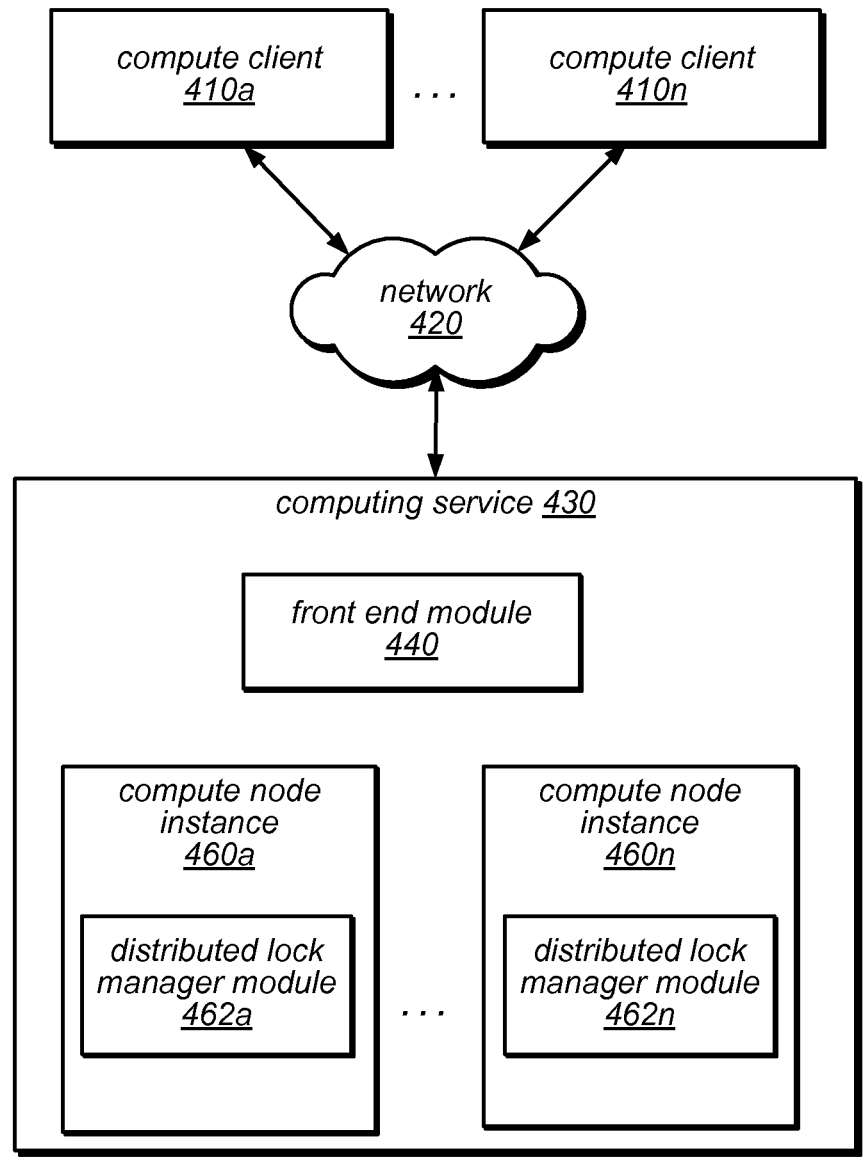
FIG. 4 is a block diagram illustrating a computing service, according to some embodiments.

FIG. 4 is a block diagram illustrating a computing service, according to some embodiments. A compute cluster may, in some embodiments, be implemented as part of a computational service. However, a compute cluster may be also be configured individually, separate from a particular network-based or other computing service, and thus the following description is noted intended to be limiting. It is noted that where one or more instances of a given component may exist, reference to that component herein below may be made in either the singular or the plural. However, usage of either form is not intended to preclude the other. In various embodiments, the components illustrated in FIG. 4 may be implemented directly within computer hardware, as instructions directly or indirectly executable by computer hardware (e.g., a microprocessor or computer system), or using a combination of these techniques. For example, the components of FIG. 4 may be implemented by a distributed system including a number of computing nodes (or simply, nodes), such as computing system 2000 in FIG. 14 described below. In various embodiments, the functionality of a given computing system component may be implemented by a particular computing node or may be distributed across several computing nodes. In some embodiments, a given computing node may implement the functionality of more than one storage service system component.

Generally speaking, compute clients 410a-410n may encompass any type of client configurable to submit web services requests to computing service 430 via network 420, similar to clients 250 described above. For example, a given compute client 410 may include a suitable version of a web browser, or a plug-in module or other type of code module configured to execute as an extension to or within an execution environment provided by a web browser to provide database or data storage service clients (e.g., client applications, users, and/or subscribers) access to the services provided by compute service 430. Alternatively, a compute client 410 may encompass an application that may make use of computing resources. In various embodiments, compute clients 410 may be compute nodes of a compute cluster (or a distributed lock manager module/application implemented at a compute nodes in a compute cluster). In some embodiments, such an application may include sufficient protocol support (e.g., for a suitable version of Hypertext Transfer Protocol (HTTP)) for generating and processing web services requests without necessarily implementing full browser support for all types of web-based data. That is, compute client 410 may be an application configured to interact directly with computing service 430. In various embodiments, compute client 410 may be configured to generate web services requests according to a Representational State Transfer (REST)-style web services architecture, a document- or message-based web services architecture, or another suitable web services architecture.

Compute clients 410 may convey web services requests to and receive responses from computing service 430 via network 420. In various embodiments, network 420 may encompass any suitable combination of networking hardware and protocols necessary to establish web-based communications between clients 410 and computing service 430. For example, network 420 may generally encompass the various telecommunications networks and service providers that collectively implement the Internet. Network 420 may also include private networks such as local area networks (LANs) or wide area networks (WANs) as well as public or private wireless networks. For example, both a given client 410 and computing service 430 may be respectively provisioned within enterprises having their own internal networks. In such an embodiment, network 420 may include the hardware (e.g., modems, routers, switches, load balancers, proxy servers, etc.) and software (e.g., protocol stacks, accounting software, firewall/security software, etc.) necessary to establish a networking link between given client 410 and the Internet as well as between the Internet and computing service 430. It is noted that in some embodiments, clients 410 may communicate with computing service 430 using a private network rather than the public Internet. For example, clients 410 may be provisioned within the same enterprise as the data storage service (and/or the underlying system) described herein. In such a case, clients 410 may communicate with computing service 430 entirely through a private network 420 (e.g., a LAN or WAN that may use Internet-based communication protocols but which is not publicly accessible).

Computing service 430 may include a front end module 440 to provide handle various client requests, such as parsing and/or throttling of service requests, authentication and/or metering of service requests, and dispatching service requests, as well as various administrative functions, such as to provide visibility and control to clients via an admin console, or to perform heat balancing, and/or anomaly control, and/or resource allocation among compute clusters. Front end module 440 may configure compute clusters, such as by instantiating or launching compute clusters configured to operate using client selected software, operating systems, images, etc. . . .

Compute node instances 460 may be configured to perform, implement, run, or execute a variety of distributed computational tasks, such as data analysis or simulation. Compute node instances 460 may be configured to perform in compute clusters. In some embodiments, the number of compute node instances in compute clusters may be scaled up or down depending on current client demand, the type, size, or cost of the distributed application running at the compute cluster, or in response to client requests. Compute node instances may each implement a distributed lock manager module 460, in some embodiments, in order to provide lock services for coordinating operations among compute nodes instances that make up a compute node cluster.

Figure 5A:
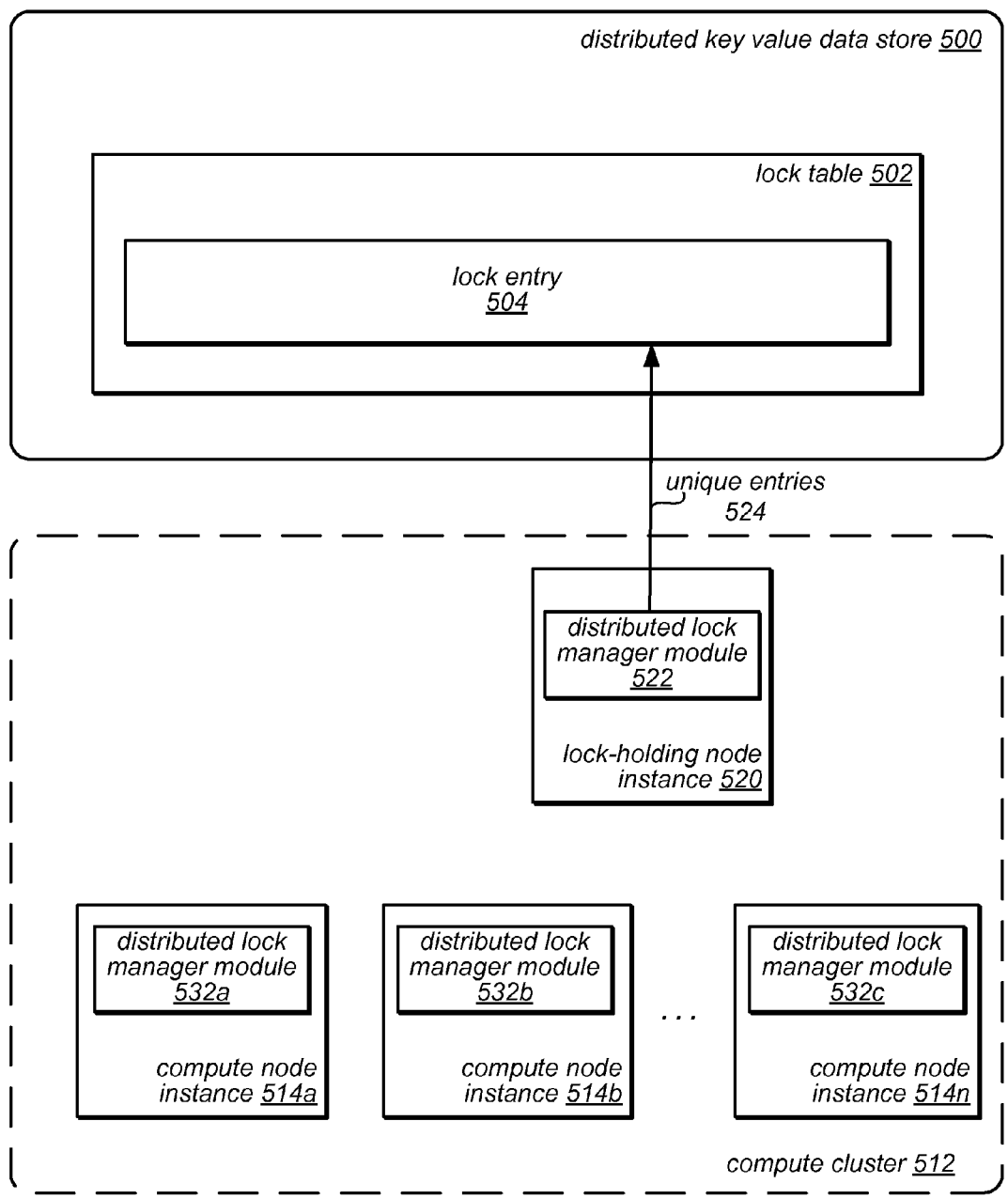
FIGS. 5A-5C are block diagrams illustrating interactions between a compute cluster implementing a distributed lock manager and a distributed key value data store, according to some embodiments.
Figure 5B:
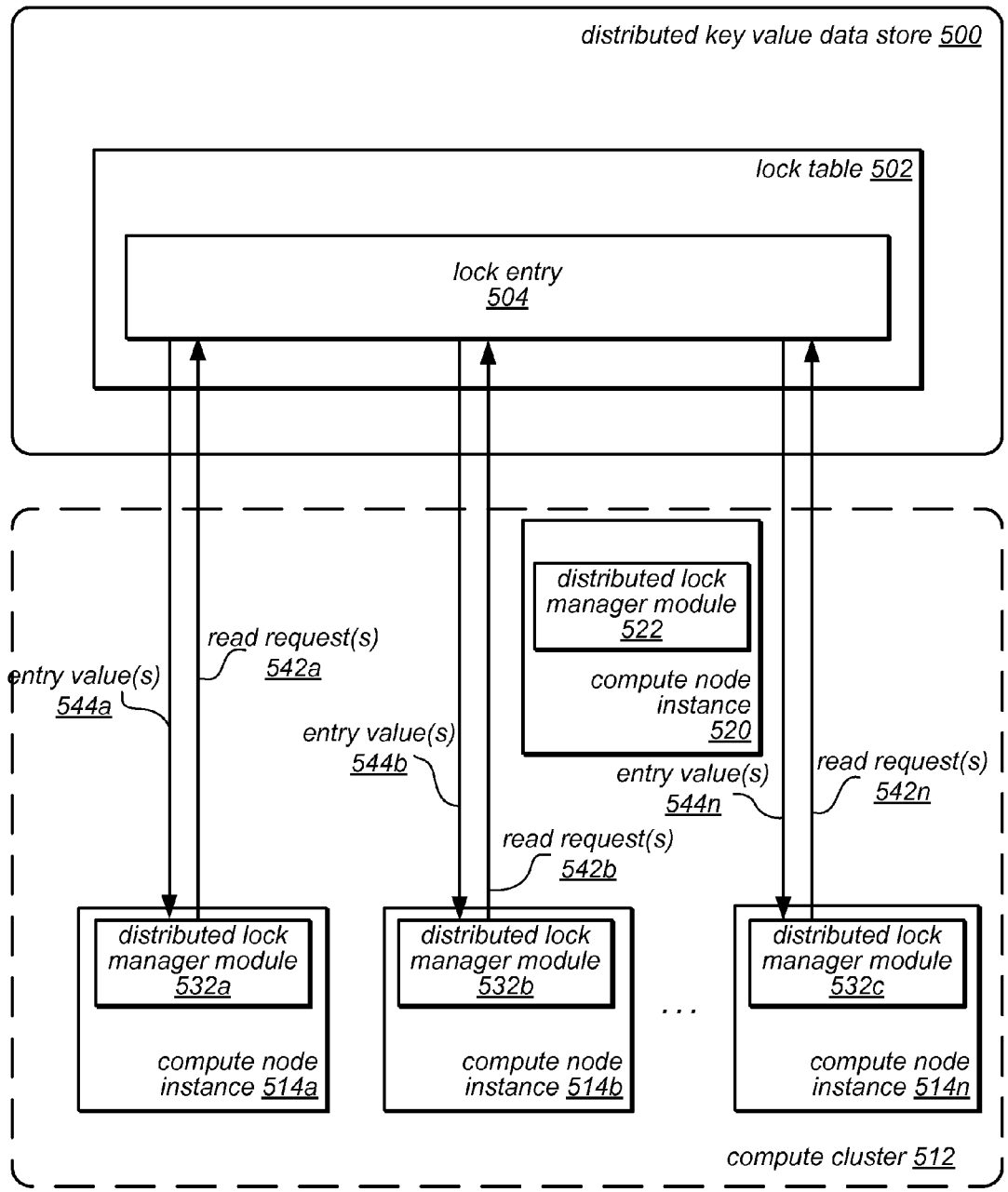
Figure 5C:
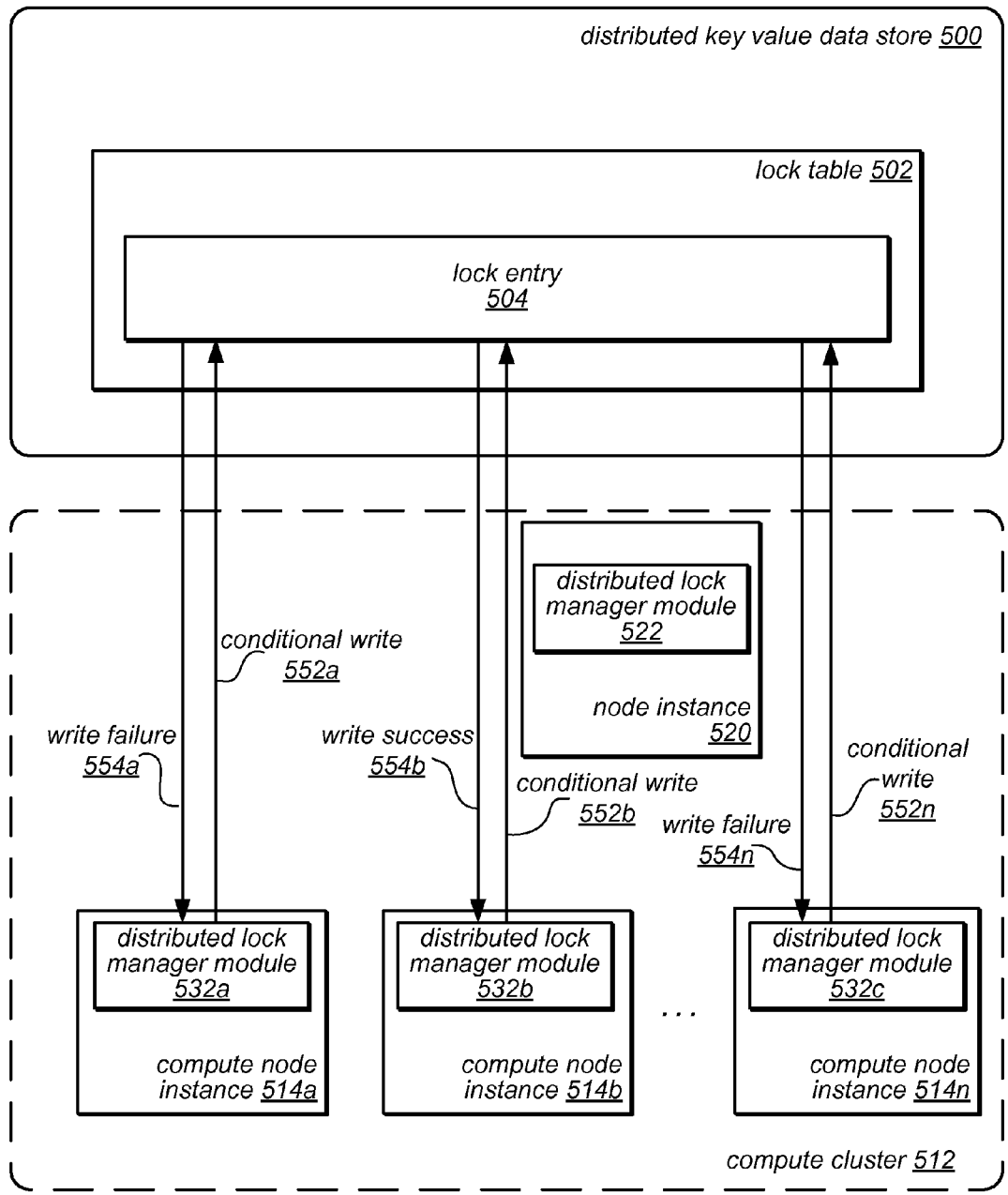

A compute cluster, whether implemented as part of a computing service as described above with regard to FIGS. 2-4, or standalone or other type of compute cluster, may implement distributed lock management using conditional updates to a distributed key value data store. In various embodiments, a compute cluster may implement distributed lock management at individual nodes in the compute cluster, such that each compute node may be able to ascertain the availability of locks for the compute cluster, as well as obtain locks in a manner that achieves consensus with the other nodes in the compute cluster. Such techniques may be implemented at each compute node by a distributed lock manager module. FIGS. 5A-5C are block diagrams illustrating interactions between a compute cluster implementing a distributed lock manager and a distributed key value data store, according to some embodiments.

In FIG. 5A, a compute cluster 512 may implement multiple compute nodes, such as compute node instances 514a, 514b, 514n, and 520. These compute node instances may be computing systems or devices, or virtual instances, as described above with regard to FIG. 4. Each compute node instance may implement a respective distributed lock manager module, such as distributed lock manager modules 532a, 532b, 532n and 522. These lock manager modules may, in various embodiments, be configured to act as a lock service or system to distributed applications performing on the compute nodes instances. Locks to perform particular operations, roles, or other types of tasks, such as updating specific data, objects, or other work, may be acquired by distributed applications at each compute node instance from the respective distributed lock manager module. Thus, in some embodiments, distributed applications may be unaware of the various techniques or communications (such as read and write requests sent to distributed key value store 500) as part of distributed lock management among the nodes of compute cluster 512.

Distributed lock manager modules may be configured to communicate with the appropriate lock table 502, which may be maintained by distributed key value data store 500. Distributed key value data store 500, like the key value data stores described above with regard to FIGS. 1-3, may be configured to perform conditional write requests and maintain data according to a distributed durability scheme. In various embodiments, distributed key value data store 500 may maintain lock table 702 for compute cluster 512 as it would for any other storage client. Thus, from the perspective of distributed key value data store 700, distributed lock manager modules operate and are treated as any other storage client storing data in distributed key value data store 700. Thus, mapping information, indexes, or other listings of locks for compute cluster 512 may be maintained at distributed lock manager modules in order to generate read and conditional write requests for the appropriate lock entries.

As illustrated in FIG. 5A, distributed lock manager module 522 at lock holding instance 520 may periodically or aperiodically send unique entries 524 to update lock entry 504 for the lock which lock holding instance 520 currently holds. These unique entries 524 may update version or other information maintained for the lock in lock entry 504 which may indicate that the lock is still in use, and is not available. Unique entries 524 may be Globally Unique Identifiers (GUIDs), monotonically increasing identifiers, or some other set of information, such as a node id, timestamp, etc. . . . that may be used or combined to generate a different unique entry.

FIG. 5B illustrates that compute node instance 520 has released the lock. Determinations to release the lock may occur in a variety of different scenarios. Compute node instance 520 may, for example, have completed tasks or operations associated with the lock such that holding the lock is no longer required. In some embodiments, another system, or system component, such as a control plane system for the computing service in FIG. 4, may write a value to lock entry 504 indicating that compute node instance 520 is to release the lock (e.g., at a certain time). In another example, distributed lock manager module 522 may determine that lock entry 504 currently held by compute node 520 has been modified in some away (e.g., an unauthorized modification) and in response, compute node instance 520 may release the lock. In some embodiments in order to release the lock, distributed lock manager module 522 may update lock entry 504 to indicate that it is available, or, distributed lock manager module 522 may cease sending unique entries 524 within a heartbeat or other lease duration interval. At some time, one or more compute node instances may determine that they wish to acquire the lock corresponding to lock entry 504. Thus, compute node instances 514a, 514b, and 514n may need to determine whether the lock is available. Distributed lock manager modules 532a, 532b, and 532n may send respective read requests 542a, 542b, and 542n for lock entry 504 in order to obtain one or more entry values 544a, 544b, and 544n. In various embodiments, a determination may be made as to whether the lock is available based on these entry values. For example, FIG. 11, discussed below, describes techniques for comparing two lock entry values to identify a lock that is no longer being renewed by a lock holder. Although not illustrated, in some embodiments, distributed lock manager modules may send a conditional write request (including the first obtained lock entry value) instead of a second read request in order to obtain the lock/or determine that the lock is unavailable (in response to receiving a write failure response). In some embodiments, the lock entry value may itself indicate whether or not the lock is currently available.

FIG. 5C illustrates one or more compute node instances attempting to acquire an available lock. Distributed lock management modules 532a, 532b, and 532n may each generate and send conditional write requests 552a, 552b, and 552n to distributed key value data store 500 in order to update lock entry 504 and acquire the lock. Each write request may include information identifying the respective sender of the write request as the new lock holder. Other information about the lock, a timestamp, lease duration, or heartbeat interval, may also be included in the updated lock entry. As discussed above, distributed key value data store 500 is configured to perform conditional write request, and as such, only node of the conditional write requests to change the lock entry from its current value to a new value may be performed. FIG. 5C illustrates write completion response indicating success 554b is sent to distributed lock manager module 532b, so that compute node instance 514b may operate using the exclusivity granted by the acquired lock. Write completion responses indicating a failure to complete the write request 554a and 554n may be sent to respective distributed lock manager modules, 532a and 532n, which may deny their respective compute node instances the lock, or delay and try again to obtain the lock at a later time before indicating that the lock is unavailable.

In various embodiments, leader node election for a compute cluster may be performed using the distributed lock management techniques described above in FIGS. 1-5C. Implementing leader node elections using distributed lock management may also allow for self-corrective, cluster scaling, and other operations changing, adding to or removing from the membership of a compute cluster, as new leader node election may be easily performed. For example, in at least some embodiments, the techniques illustrated in FIGS. 5A-5C may be used at startup for a compute cluster, in order to select a first leader node for the cluster. In another example illustrated in FIGS. 6A and 6B, distributed lock management may allow for individual compute nodes to perform self-corrective actions based on information obtained about current locks and their respective holders.

Figure 6A:
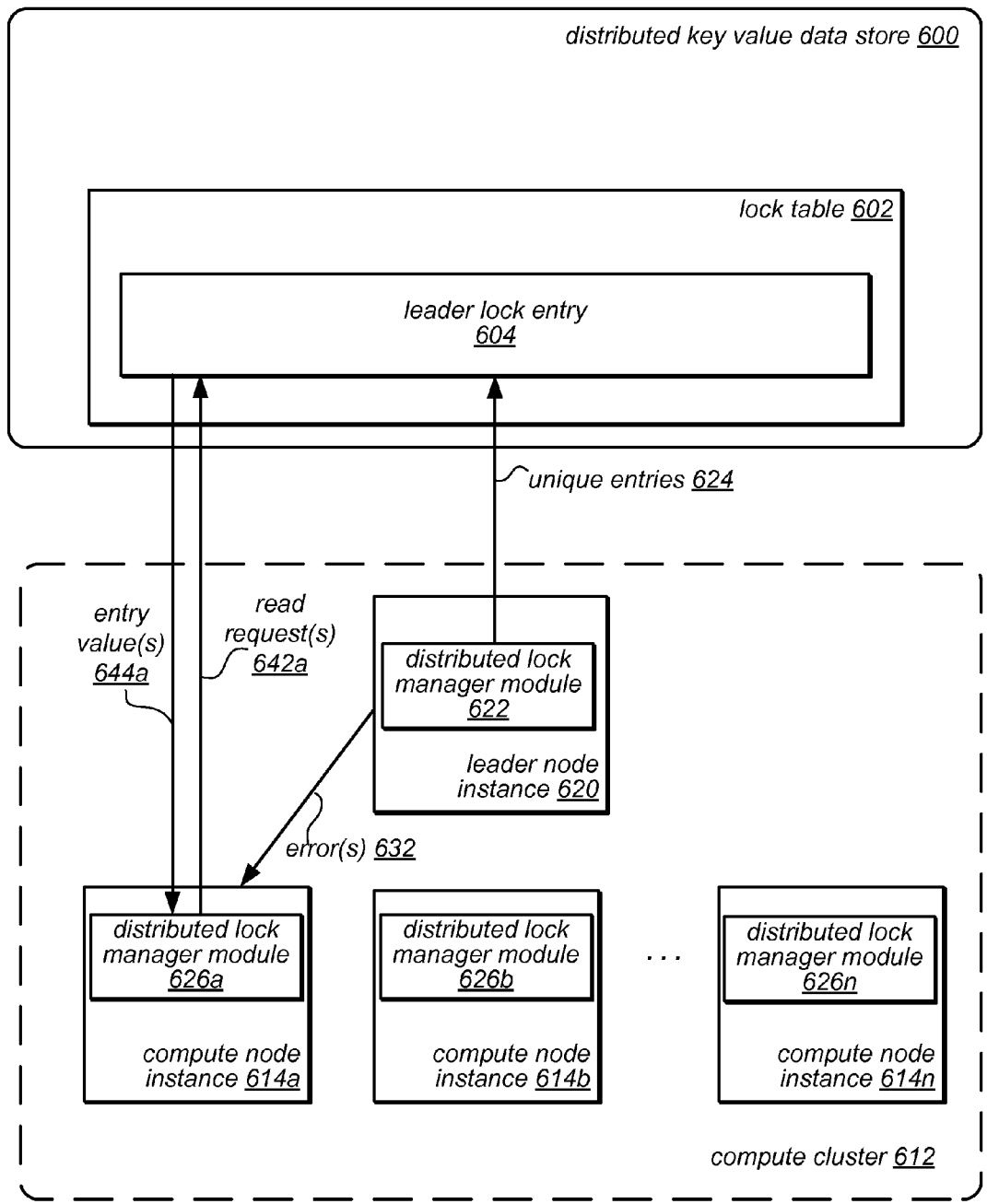
FIGS. 6A-6B are block diagrams illustrating compute node interactions with a leader node in a compute cluster implementing a distributed lock manager, according to some embodiments.
Figure 6B:
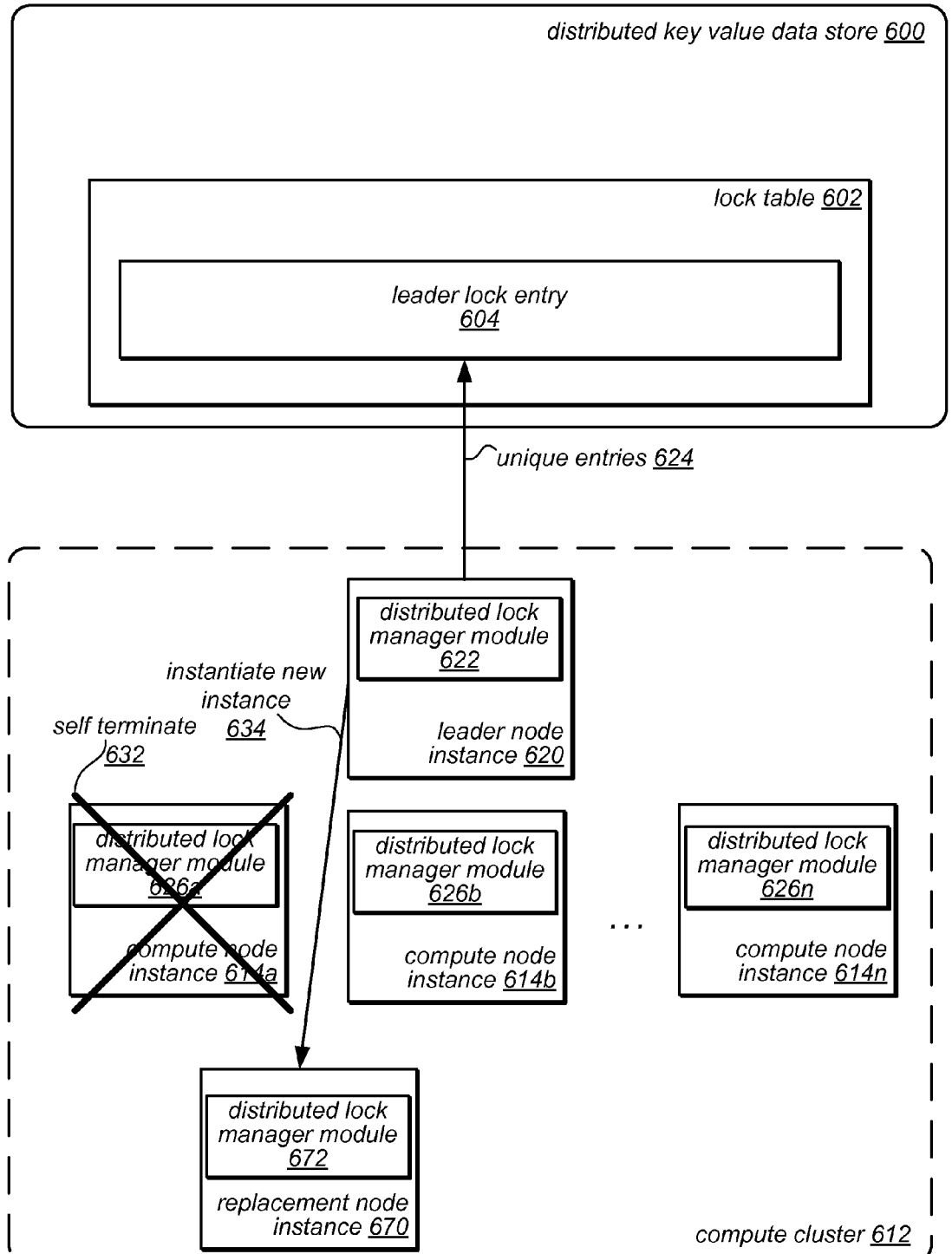

FIGS. 6A-6B are block diagrams illustrating compute node interactions with a leader node in a compute cluster implementing a distributed lock manager, according to some embodiments. As described above with regard to FIGS. 5A-5C, distributed key value data store 600 may maintain a lock table 602 for lock entries corresponding to locks for compute cluster 612. Compute cluster 612 may implement multiple compute node instances 614a, 614b, through 614n. Each compute node instance may implement respective distributed lock manager modules, 626a, 626b, and 626n. Leader lock entry 604 may identify the leader node for compute cluster 612, which is illustrated as leader node instance 620. Leader node instance 620 may also implement a respective distributed lock manager 622.

FIG. 6A illustrates that leader node 622 still maintains possession of the leader node lock in leader lock entry 604 by periodically or aperiodically sending different unique entries 624 via distributed lock manager module 622 to update the leader lock entry 604 in lock table 602. Compute node instance 614a, however, may have sent one or more requests to leader node 622, and may have received no response, or errors 632. Compute node instance may use leader lock entry 604 to determine whether leader node 622 is still available/active/healthy. Compute node 614a may send one or more read requests 642a via distributed lock manager module 626a for current values of leader lock entry 604. Compute node 614a may then receive the entry values 644a in response to the requests 642a, in order to determine whether leader node 622a is still actively heart beating/renewing the leader node lock.

FIG. 6B illustrates that compute node 614a has determined that leader node 614a still actively holds the leader node lock. Compute node 614a may perform a self-corrective action, such as repair request to the leader node 622, or to some control plane or computing cluster management system to request repair. Alternatively, as illustrated in FIG. 6B, compute node 614a may self-terminate. Leader node instance 622 may implement cluster-leveling or scaling techniques in order to maintain a certain number of compute nodes in cluster 612. For example, leader node 622 may instantiate a new instance 634, replacement node instance 670, which may implement a respective distributed lock manager module 672.

Leader node instances may also perform self-corrective actions, relying upon distributed lock management for leader node election, in various embodiments. FIGS. 7A-7D are block diagrams illustrating self-corrective leader node actions and a leader node election using a distributed lock manager, according to some embodiments. As described above with regard to FIGS. 5A-5C, distributed key value data store 700 may maintain a lock table 702 for lock entries corresponding to locks for compute cluster 712. Compute cluster 712 may implement multiple compute node instances 714a, 714b, through 714n. Each compute node instance may implement respective distributed lock manager modules, 726a, 726b, and 626n. Leader lock entry 704 may identify the leader node for compute cluster 712, which is illustrated as leader node instance 720. Leader node instance 720 may also implement a respective distributed lock manager 722.

Figure 7A:
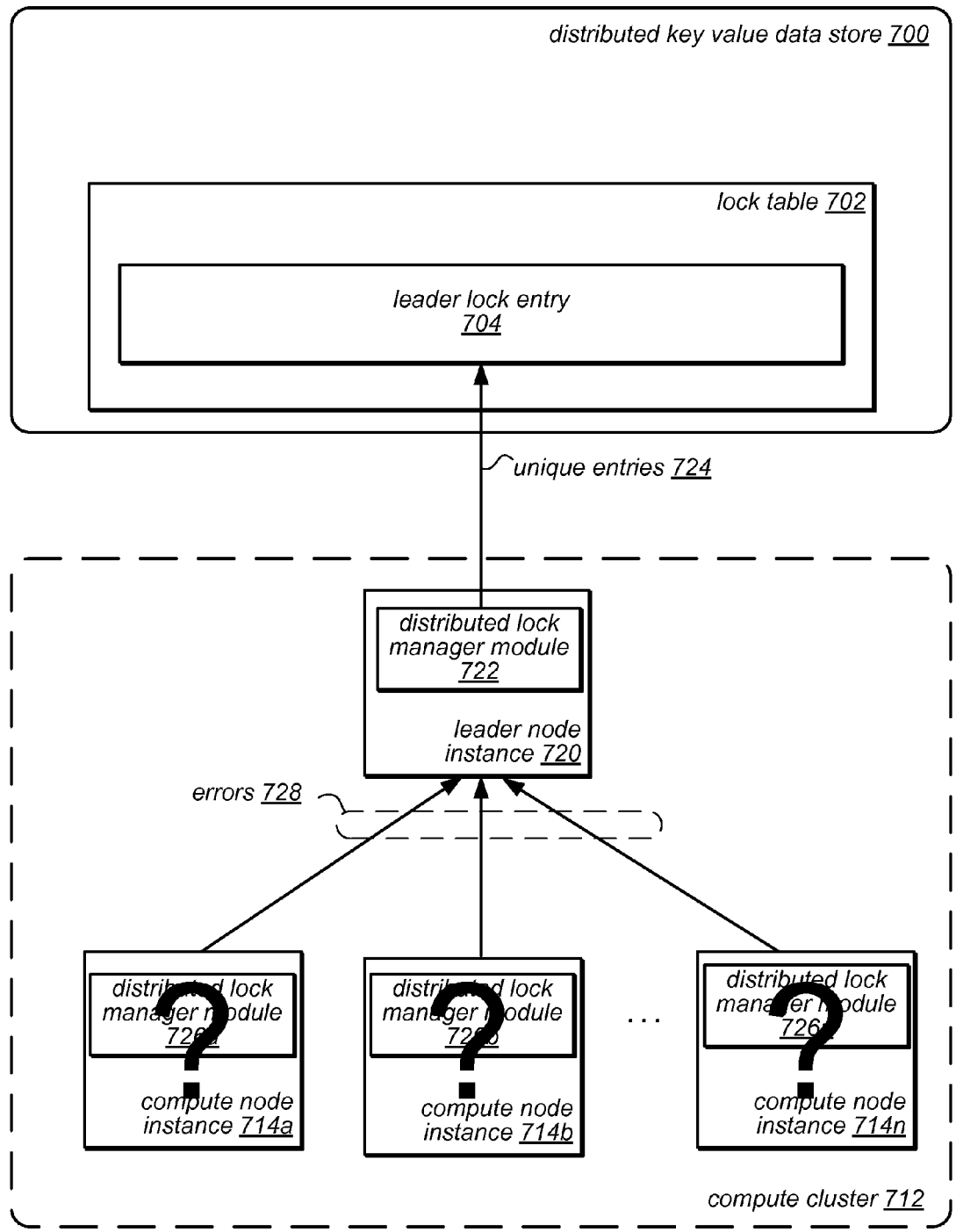
FIGS. 7A-7D are block diagrams illustrating self-corrective leader node actions and a leader node election using a distributed lock manager, according to some embodiments.

FIG. 7A illustrates that leader node instance 720 still maintains possession of a leader lock corresponding to leader lock entry 704 by updating the leader lock entry via distributed lock manager module 722 with unique entries 724. Leader node instance 720 may however, have lost contact or communication with some or all of compute node instances in the compute cluster (e.g., as a result of a network partition). For example, as illustrated in FIG. 7A, leader node instance 720 may receive error messages 728, or no responses at all to requests sent from leader node instance 720.

Figure 7B:
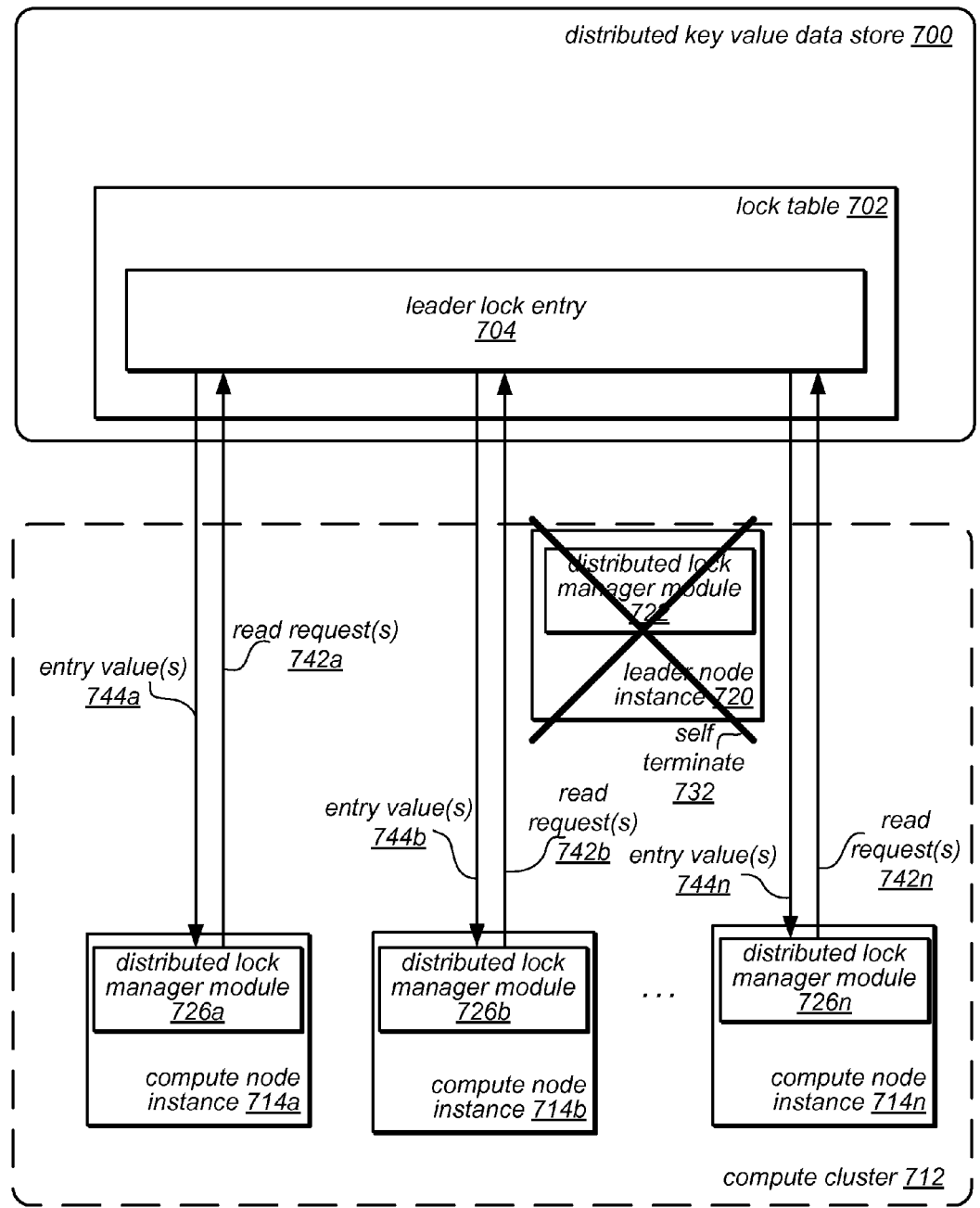

In some embodiments, a leader node may enforce a quorum or other durability requirement for a compute cluster. A quorum requirement may specify a minimum number of compute nodes in order to provide a minimum durability, performance, or service guarantee. Thus, leader node instance 720 may determine that remaining compute nodes with which the leader node may have contact are in sufficient to satisfy the quorum requirement. Thus, leader node 720 may perform a self-corrective action in order to ensure that the quorum or other durability requirement is satisfied. In some embodiments, leader node instance 720 (or other control plane system) may perform health checks on or instantiate new compute node instances sufficient to satisfy the quorum or durability requirement. In another example, as illustrated in FIG. 7B, leader node instance 720 may self-terminate 732 (or otherwise relinquish the leader node lock).

Figure 7C:
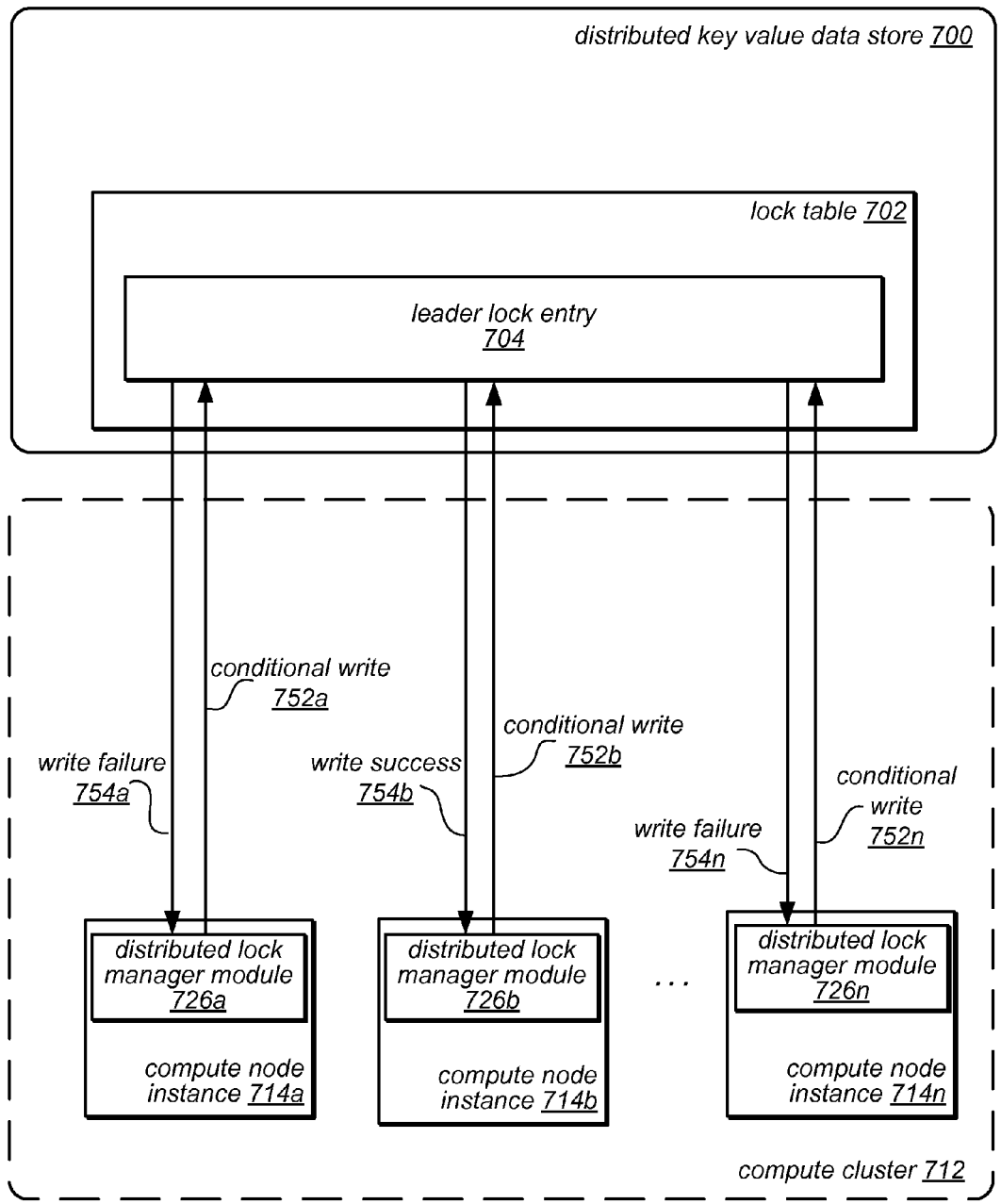

Compute node instances 714a, 714b, and 714n in compute cluster 712 may have also determined that communication or other errors were occurring with leader node instance 720. Some or all of the compute node instances, 714a, 714b, and 714n may via their respective distributed lock manager modules, 726a, 726b, and 726n, issue read requests 742a, 742b, and 742n to distributed key value data store 700 in order to obtain entry values 744a, 744b, and 744n for leader lock entry 704. Using the various techniques discussed above, with regard to FIG. 5B, as well as below with regard to FIGS. 8-11, compute node instances 714 may determine that the leader lock is available. FIG. 7C illustrates compute node instances 714 performing leader node election. Each compute node instance 714a, 714b, and 714n may send a respective conditional write request 752a, 752b, and 752n, including identification information in order to acquire the leader lock. As illustrated in FIG. 7C, only node of the compute node instances, 714b, may receive an indication of a successful write 754b. Other compute node instances 714a and 714n may receive write failure indications 754a and 754n.

Figure 7D:
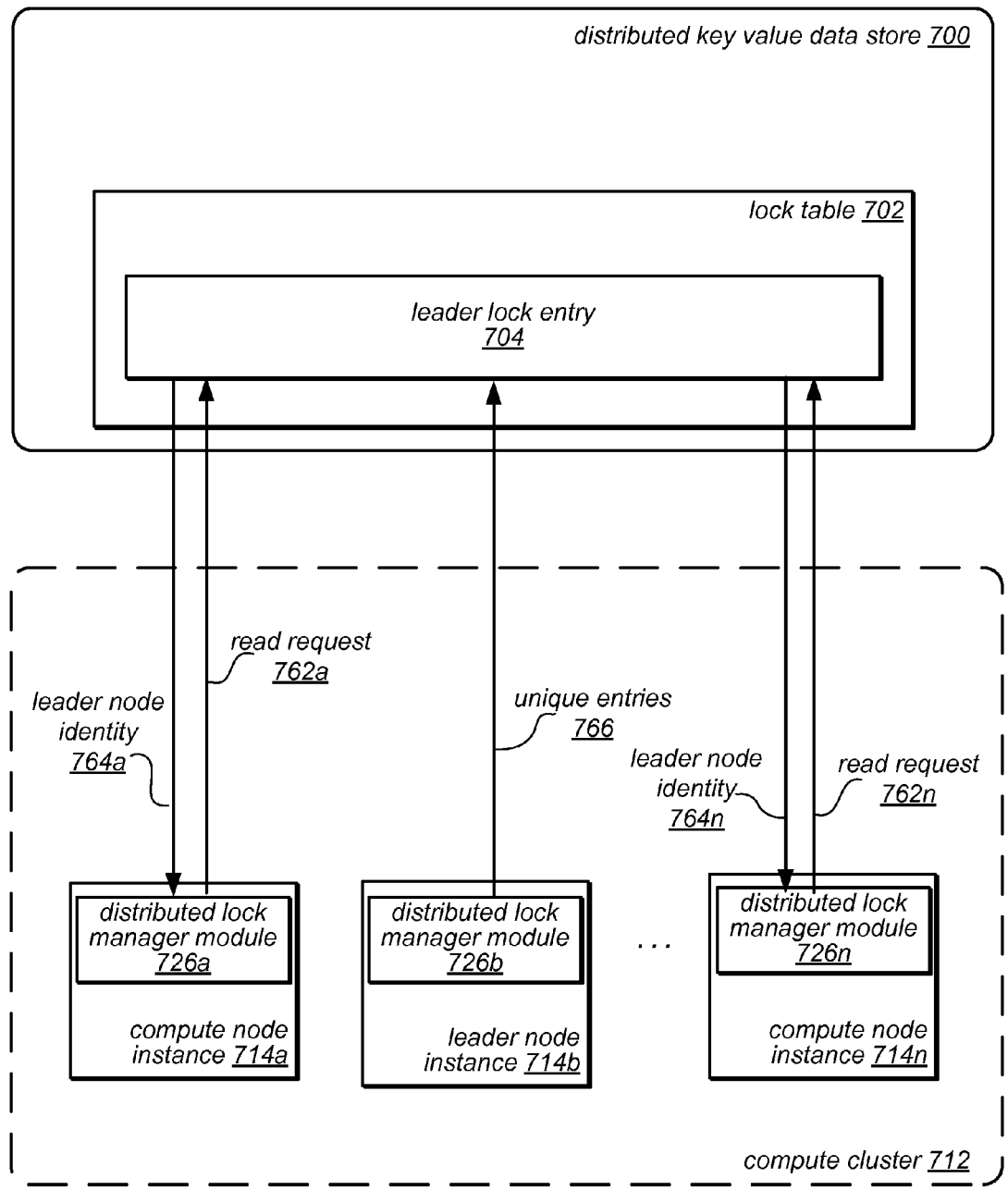

Compute node instance 714b may then begin to operate in the role of leader node for compute cluster 712, as illustrated in FIG. 7D, performing the various leader node functions assigned to the role of leader node. In order to maintain the leader node lock, leader node instance 714b may send unique entries 766 to update leader lock entry 704 according to a heartbeat, lease duration, or other interval, periodically, or aperiodically, in order to signify to other compute node instances that may read leader lock entry 704 that leader node instance 714b still holds the leader lock. Compute node instances 714a and 714n may send respective read requests 762a, and 762n, to obtain the identity of the new leader node, 764a and 764n.

Figure 8:
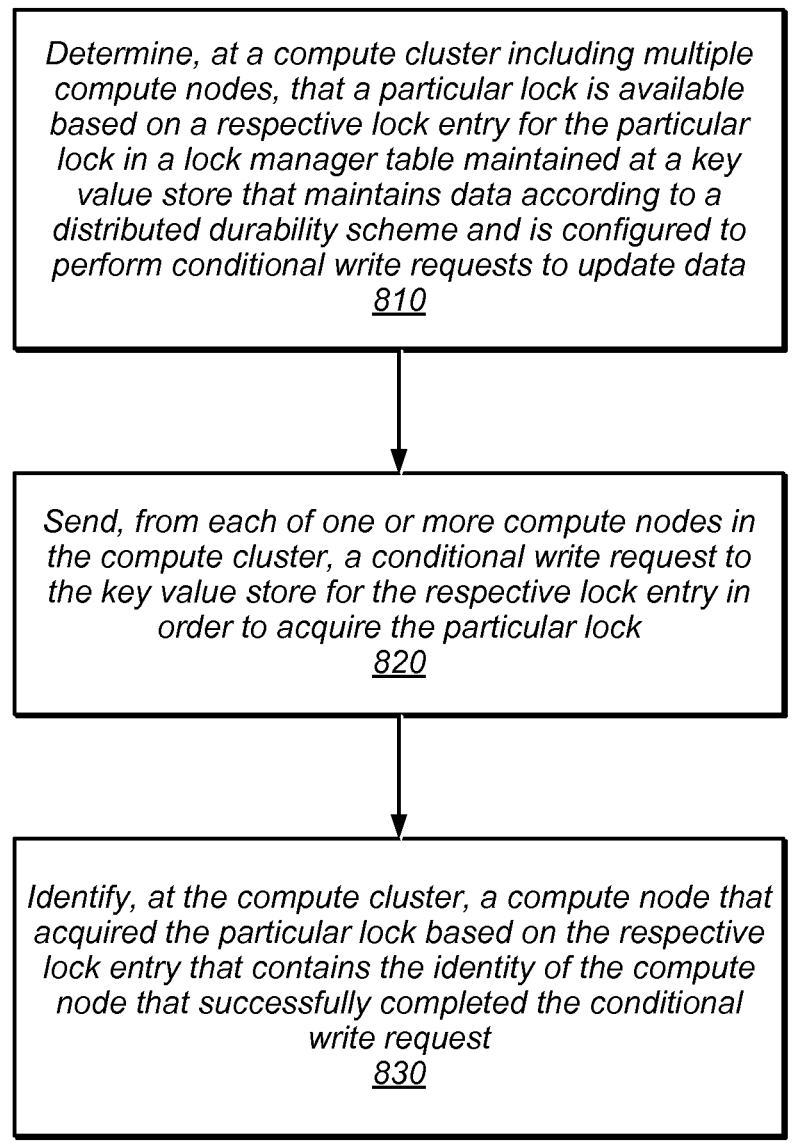
FIG. 8 is high-level flowchart illustrating various methods and techniques for implementing distributed lock management using a distributed key value data store, according to some embodiments.

The examples of distributed lock management using conditional updates to a key value data store discussed above with regard to FIGS. 2-7 have been given in regard to a network-based service providing a key value data store and one or more other computing services proving a compute cluster. Various other types of computing clusters and/or key value data stores may be used to implement distributed lock management using conditional updates to a key value data store for a compute cluster. FIG. 8 is high-level flowchart illustrating various methods and techniques for implementing distributed lock management using a distributed key value data store, according to some embodiments. These techniques may be implemented using compute clusters and/or key value data stores as described above with regard to FIGS. 2-7, as well as other compute clusters and/or key value data stores, and thus the following discussion is not intended to be limiting as to the other types or configurations of key value data stores or compute clusters that may implement the described techniques. For example, distributed lock manager modules implemented on compute nodes may implement some or all of the various techniques described below.

As indicated at 810, a particular lock may be determined to be available at a compute cluster based on a respective lock entry for the particular lock in a lock manager table maintained at a key value data store, in various embodiments. The lock manager table may maintain lock entries corresponding to locks that are currently maintained or created for use in a compute cluster. Locks may be created/maintained for short durations (fine-grained access) or for longer durations (coarse-grained access). The entry for a particular lock may maintain various information about the lock, such as the lock type, data or metadata describing the lock, the current holder of the lock, instructions to the current lock holder or other compute nodes reading the lock entry, a least time or heartbeat interval for the lock, as well as version information about the lock, such as Globally Unique Identifier (GUID), monotonically increasing number, or some other information used to determine whether a corresponding lock is still in use by a lock holder.

The key value data store may maintain data according to a distributed durability scheme. A distributed durability scheme, as discussed above, may be a form of redundancy, replication, distribution, or availability of data maintained at the key value data store for clients of the key value data store. As noted above, a distributed durability scheme may provide a level of high availability for data stored in the key value data store. For example, as described above in FIG. 3, a key value data store may implement multiple storage nodes storing a replica of data, such as the lock manager table. Various techniques for ensuring that updates or changes to the lock manager table are made consistently, may also be implemented as part of a data durability scheme. For example, a key value data store may use a different lock system or service, either external to or internal to the key value data store in order to ensure that consensus is maintained among storage nodes in the key value data store. A Paxos-based technique, for instance, may be implemented for such storage node operations at a key value data store as implementing leader node elections as part of leader node failover operations among storage clusters at a key value data store.

A key value data store may also be configured to perform conditional write requests to update data maintained at the key value data store. For example, conditional write requests to lock entries in the lock manager table may be performed (at least from the perspective of a compute node sending the conditional write request) atomically, either performed or not performed. Consider the scenario where multiple compute nodes send a conditional write request to update a particular entry in the lock manager table. Each compute node may send a conditional write request to update the current value for the lock entry. When a conditional write request is received at the key value data store, it may first be determined whether another write has already begun for the lock entry. If, for example, the current value of the lock entry is no longer the current value of the lock entry, but a different value, then an error or failure message may be sent back to the sender of the conditional write request indicating that the conditional write request failed to complete. If, however, the current value is the same, then it may be determined that the conditional write request is the first write request received for that entry from the group of compute nodes (and is not intervening on another write operation to the entry), and the write request may performed in such a way that the entire write is completed before a success or completion response is sent (or in the event of a failure at the key value data store that the write is not completed or maintained at the key value data store). In at least some embodiments key value data stores may also provide read-after-write consistency, such that read operations received at the key value store after completion of write operations read the newly written data as part of servicing the read request.

A determination as to whether a particular lock is available, as indicated at 810, may be made based on a respective lock entry for the particular. Thus, in various embodiments, a read request for the lock entry may be sent from one or more compute nodes that are determining the lock's availability to obtain the respective lock entry. In some embodiments, available locks may be marked or otherwise indicated in a lock entry when release by a compute node. However, in a least some embodiments, a lock may be maintained or held by sending lock renewals (or heartbeats) which may be write requests that update version information maintained for the lock entry. In some embodiments, a conditional write request may be sent upon expiration of a heartbeat interval after an initial read request. The conditional write request may include the lock entry obtained in the read request that is to be replaced by the conditional write request. If the conditional write request successfully completes (as in some embodiments, the distributed key value data store may only successfully complete the write request if the current data to be replaced is identified and/or included in the conditional write request so that if it has already been changed then the write may not complete successfully), then the lock may be available, and acquired by the sender of the conditional write request. FIG. 11, described in further detail below, illustrates the various ways in which data maintained in the lock entries may be used to detect locks that are available.

As indicated at 820, one or more compute nodes in the compute cluster (such as those compute nodes that desire or have determined that a particular lock is available) may send a conditional write request to the key value data store for the respective lock entry in order to acquire the particular lock. The conditional write request may include information identifying the compute node as the new lock node holder, information about the lock itself (such as a current value), version information (such as a different unique entry), or other information regarding the lock. As discussed above, a successful completion of a write request for a particular compute node, may be responded to with a success or completion message. Failure to complete a conditional write request (as another compute node may have completed first), may be responded to with a failure to complete or other error message.

As indicated at 830, the compute node that acquired the lock may be identified at the compute cluster based on the respective lock entry that contains the identity of the compute node that successfully completed the write request. Other compute nodes that received error or failure to complete messages, as well as other compute nodes in the compute cluster may send a read request for the particular lock entry in order to obtain information identifying the current lock holder. Such information may be used in cluster operations, such as when performing a leader node election using leader lock, so that other compute clusters may be able to identify a newly elected leader node. However, in some embodiments, each compute node in a compute cluster may enforce locking policies that may only need to determine whether the particular compute node has acquired a lock, or not. Thus, compute nodes need not be aware of the identity of the current lock holder as long as they are aware that they do not have the lock.

Figure 9:
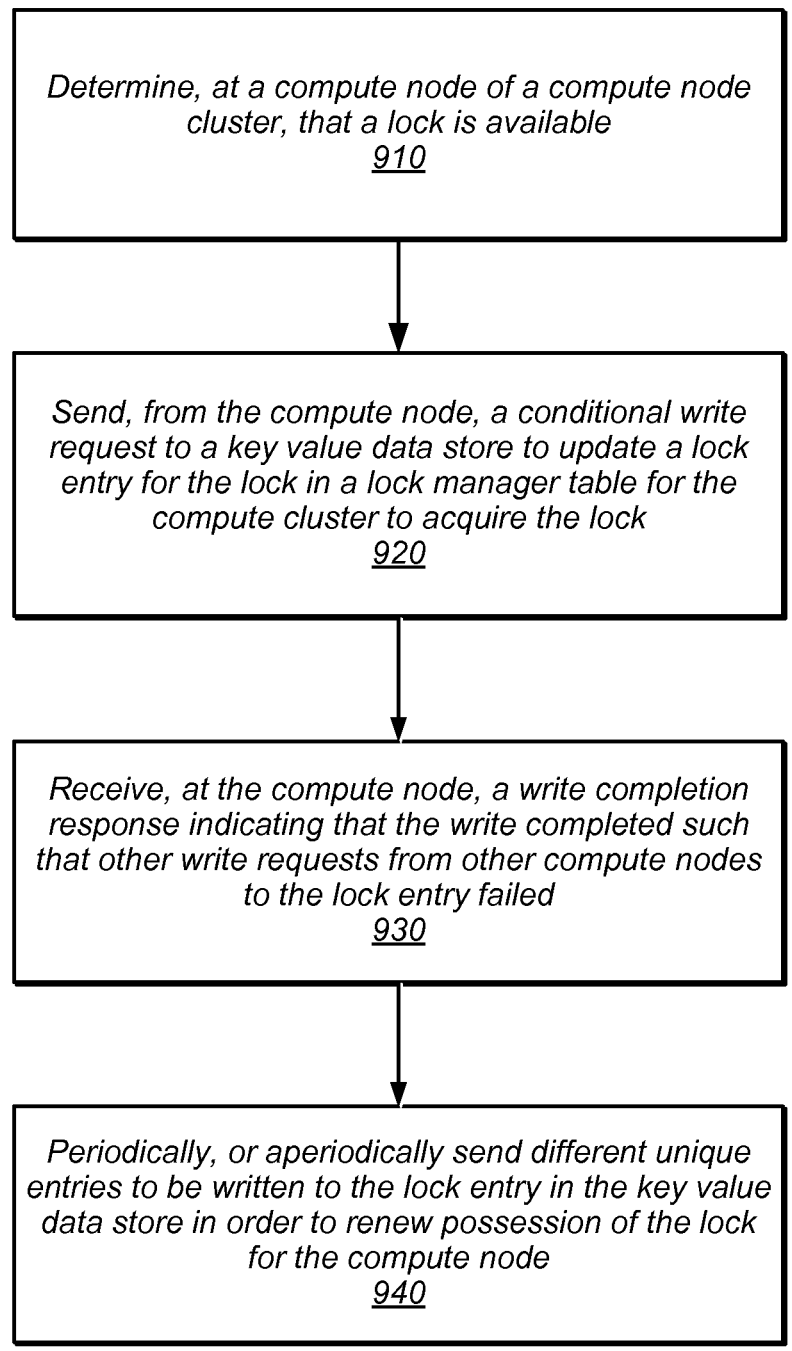
FIG. 9 is a high-level flowchart illustrating successfully acquiring a lock at a compute cluster implementing distributed lock management using a distributed key value data store, according to some embodiments.

Various further operations may be performed for compute nodes that successfully or unsuccessfully obtain a particular lock. FIG. 9 is a high-level flowchart illustrating successfully acquiring a lock at a compute cluster implementing distributed lock management using a distributed key value data store, according to some embodiments. As indicated at 910, a compute node may determine that a lock is available, (according to the techniques discussed above, and below with regard to FIG. 11). A conditional write request may be sent from the compute node to the key value data store in order to update a lock entry for the lock in a lock manager table to acquire the lock, as indicated at 920. In response to the conditional write request, the compute node may receive a write completion response indicating that the write completed at the key value data store such that other write requests from other compute nodes to the lock entry failed, as indicated at 930. Thus, the compute node may now operate as the current holder of the lock. In various embodiments, the distributed lock management techniques discussed above with regard to FIG. 8, as well as below with regard to FIG. 10-13, may operate under the assumption that compute nodes themselves will abide by the lock determinations made. In other words, each individual compute node may have to implement policies, rules, or other limitations to self-impose restrictions on operations when a lock is not held by a particular node. Possession of a lock itself does not prevent other compute nodes from acting as if they too possessed a particular lock, but instead assumes that each node may be trusted to enforce the lock determinations made by implementing distributed lock management.

In order to maintain or renew an obtained lock, the compute node may periodically, or aperiodically send different unique entries to be written to the lock entry in the lock manager table in the key value data store in order to renew possession of the lock for the compute node, as indicated at 940. These different unique entries may be different GUIDs, monotonically increasing identifiers, timestamps, or other information that may be used to determine that the compute node still holds the lock.

Figure 10:
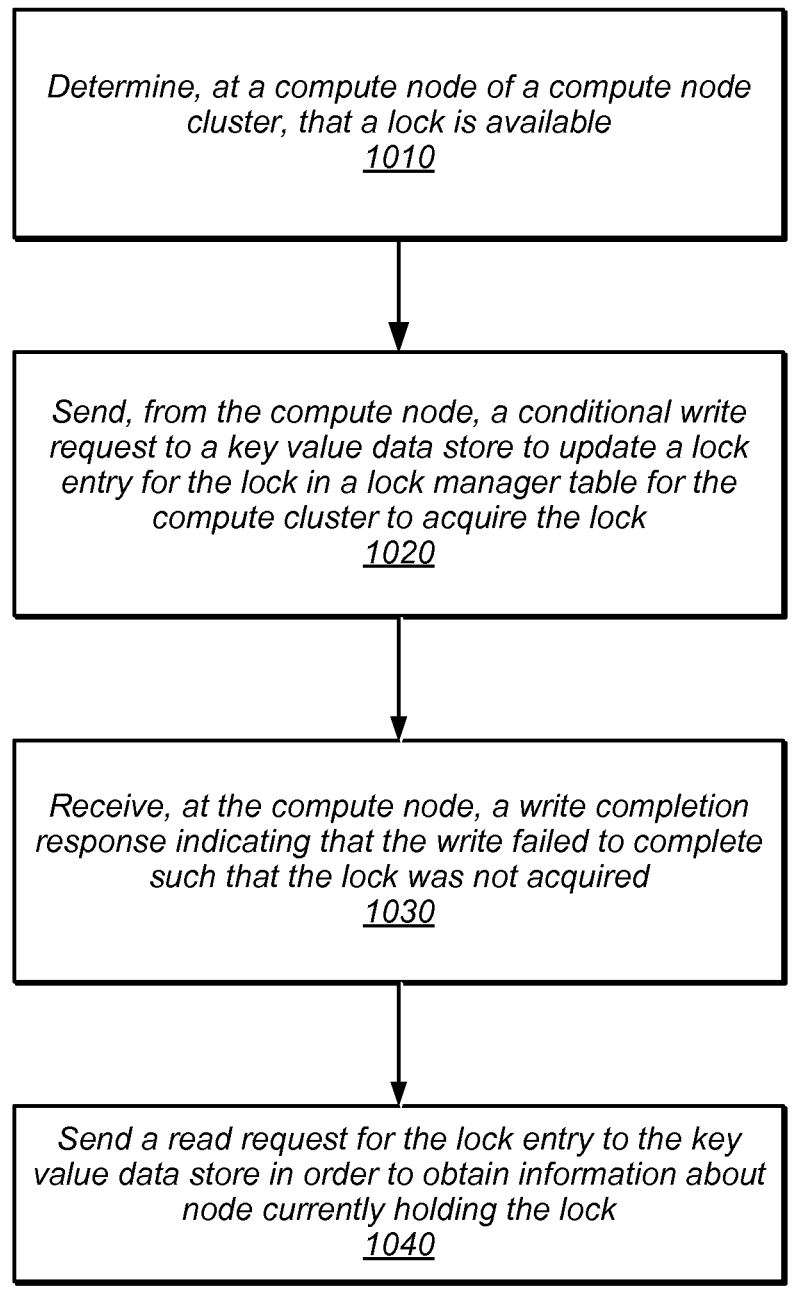
FIG. 10 is a high-level flowchart illustrating unsuccessfully acquiring a lock at a compute cluster implementing distributed lock management using a distributed key value data store, according to some embodiments.

FIG. 10 is a high-level flowchart illustrating unsuccessfully acquiring a lock at a compute cluster implementing distributed lock management using a distributed key value data store, according to some embodiments. As indicated at 1010, a compute node may determine that a lock is available, (according to the techniques discussed above, and below with regard to FIG. 11). A conditional write request may be sent from the compute node to the key value data store in order to update a lock entry for the lock in a lock manager table to acquire the lock, as indicated at 1020. In response to the conditional write request, the compute node may receive a write completion response indicating that the write failed to complete such that the lock was not acquired, as indicated at 930. The compute node may then enter a polling or other waiting state to periodically determine whether the lock has become available again, and again perform the conditional write request to obtain the lock. In some embodiments, as indicated at 1040, a read request may be sent from the compute node to the key value data store in order to information about the node currently holding the lock. For example, as mentioned above, in some embodiments, the lock entry may indicate the current leader of the compute cluster. The compute node may need to identify the current leader of the compute cluster, and thus may send a read request to the lock entry in order to obtain the identity of the current leader of the compute cluster.

The techniques illustrated in FIGS. 8-10 may be performed for repeatedly multiple locks maintained for a compute cluster. The highly-available nature of the key value data store may allow for significant amounts of traffic, such as the read and write requests involved with performing lock availability determinations and acquisitions, to be handled. Thus locks may be implemented for fine-grained access or other operations, as well as coarse-grained access or other operations. Moreover, as no one compute node need operate as coordinator for performing lock acquisitions, distributed lock management using conditional write updates to the key value data store may take advantage of higher throughput capabilities of the key value data store to handle these read and write requests.

As discussed above with regard to FIGS. 8-10, compute nodes may be able to determine whether a lock is available based on a corresponding lock entry for the lock maintained in the lock manager table at the key value data store. For example, compute nodes may examine a timestamp or lease expiration time written in the lock entry, in order to determine when a particular lock is available. In some embodiments, however, clock skew or other timing differences between compute nodes may allow for some erroneous availability determinations to be made based on time entries alone. FIG. 11 is a high-level flowchart illustrating a method for determining whether a particular lock is available, according to some embodiments. By detecting whether a lock holder has performed a lock renewal or heartbeat, then lock availability determinations may be made independent of local time differences between compute nodes of a compute cluster.

As indicated at 1110, in some embodiments, a read request may be sent to a distributed key value data store storing a lock entry in a lock table. The read request may be performed to obtain a first current value for the lock entry. Lock entries in the database table may be unique, such that a subsequent read request for the lock entry may not obtain a same value unless no new value has been written to the lock entry. Thus, after a heartbeat (or lease) interval has expired, as indicated by the positive exit from 1120, another read request for a second current value of the lock entry may be sent to the distributed key value data store, as indicated at 1130. Alternatively, in some embodiments, a conditional write request to update the entry may be sent after expiration of the heartbeat interval 1120. If, the lock entry has been changed, the conditional write request may fail. If the conditional write request succeeds, then it may be determined that the previous lock holder released the lock (and that the node sending the conditional write request is the current lock holder).

Heartbeat intervals may, in some embodiments, be predetermined for a particular lock, or all locks in a lock manager table for a compute cluster. Other heartbeat intervals may be determined according to the compute node that has written to the lock entry and currently possesses the lock. For example, a compute node that acquires a lock for which a longer operation is necessary may include in information written to the lock entry when acquiring the lock, a length of time (or lease period) before the compute node may be expected to send a lock renewal to write another unique value to the lock entry.

A determination may then be made as to whether the first and second current values obtained from the lock manager table are the same, as indicated at 1140. In some embodiments, a particular portion, record, field, or value may be used for this comparison. For example, in some embodiments, version number for the lock may be compared. This version number may be, in some embodiments, a globally unique identifier (GUID) or a monotonically increasing number, each of which may not be repeatedly written to the same lock entry by a compute node in the compute cluster, in some embodiments. In some embodiments, the multiple or all fields of in a lock entry may be combined, modified, or processed to generate a current value, which may be compared, as illustrated at 1140. For example, each compute node may have a unique identifier that when combined with a timestamp and/or other data values may always be unique when combined. Various different ways of generating a different and unique value for the lock entry may be envisioned, and as such, the previous examples are not intended to be limiting.

For lock entries with the same first and second current value, then it may be determined that the lock is available, as indicated at 1150. For those lock entries with different first and second current values, it may be determined that the current lock holder is still performing lock renewal writes (or heartbeats) to the lock entry value, and the availability determination may be repeated again, as illustrated by negative exit from 1140.

As noted above, in some embodiments distributed lock management may be used in various ways to implement leader node election for a compute cluster, such as by providing a leader lock entry which indicates the current leader node of the compute cluster. Distributed lock management may also allow different nodes in a compute cluster to perform various corrective or scaling actions, as well as to receive information, or instructions (e.g., using a particular lock as part of a message broadcast to compute nodes in a cluster). For example, in some embodiments, a compute node may determine that it is unable to communicate or interact with a leader node, and self-terminate. Similarly, a leader node may also determine that it is unable to communicate with other compute nodes and relinquish a leader node lock and/or self-terminate.

Figure 12:
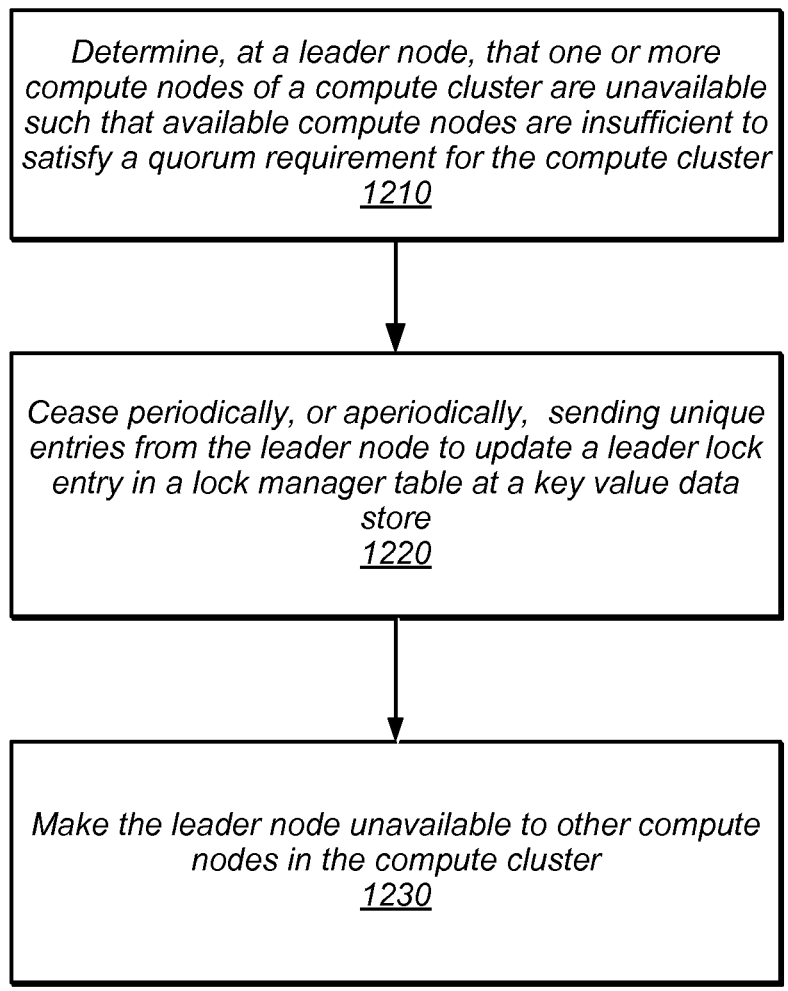
FIG. 12 is a high-level flowchart illustrating a method for triggering a leader node election using distributed lock management, according to some embodiments.

FIG. 12 is a high-level flowchart illustrating a method for triggering a leader node election using distributed lock management, according to some embodiments. As indicated at 1210, it may be determined, at a leader node of a compute cluster, that one or more compute nodes of the compute cluster are unavailable such that available compute nodes are insufficient to satisfy a quorum requirement for the compute cluster, in various embodiments. For example, a compute cluster may operate according to some durability or operational requirement that requires a quorum of compute nodes in order to provide a performance or service guarantee (e.g., leader node needs to maintain quorum of at least 3/5 nodes of the compute cluster). If, a leader node loses contact with enough compute nodes in the compute cluster, then the leader node may no longer be able to establish a quorum for performing operations at the compute cluster.

In various embodiments, a leader node that is no longer able to establish quorum may determine that it may need to relinquish the leader role for the compute cluster, and/or self-terminate (as the node itself may be experiencing communication or other failures that may inhibit performance as a compute node in the compute cluster). As discussed above, in order to relinquish the leader node lock, in various embodiments, periodically (or aperiodically) sending unique entries may be ceased from the leader node that update a leader lock entry in a lock manager table at a distributed key value data store, as indicated at 1220. For compute nodes in the compute cluster that read the leader lock entry in the lock manager table, a determination may be made that the leader node lock entry is available, such as the various polling techniques discussed above with regard to FIG. 11. Leader node election may be performed by other compute nodes in the compute cluster, and a new leader node may be identified as the compute node that successfully completed a conditional write request to the leader lock entry with identification information. In some embodiments, the former leader node may be made unavailable to other compute nodes in the compute cluster, as indicated at 1230. For example the former leader node may be terminated, and/or various mapping, routing, or other information for the compute cluster may be updated to reflect the leader node's demotion and/or unavailability. A newly elected leader node may, in some embodiments, instantiate a new compute to node replaced the terminated former leader node.

Although not illustrated, a leader node may determine to relinquish a leader lock for other reasons. For example, in some embodiments, an instruction, command, or other value, may be written to a leader lock entry. After reading (or writing) to the particular lock entry, a leader node may determine that it is to relinquish the leader lock (as discussed above at 1220). For example, another node or system, such as a compute cluster management system or control plane, may write a release instruction to the leader lock entry such that in response to reading the leader lock entry, the current leader node may release the leader lock.

Figure 13:
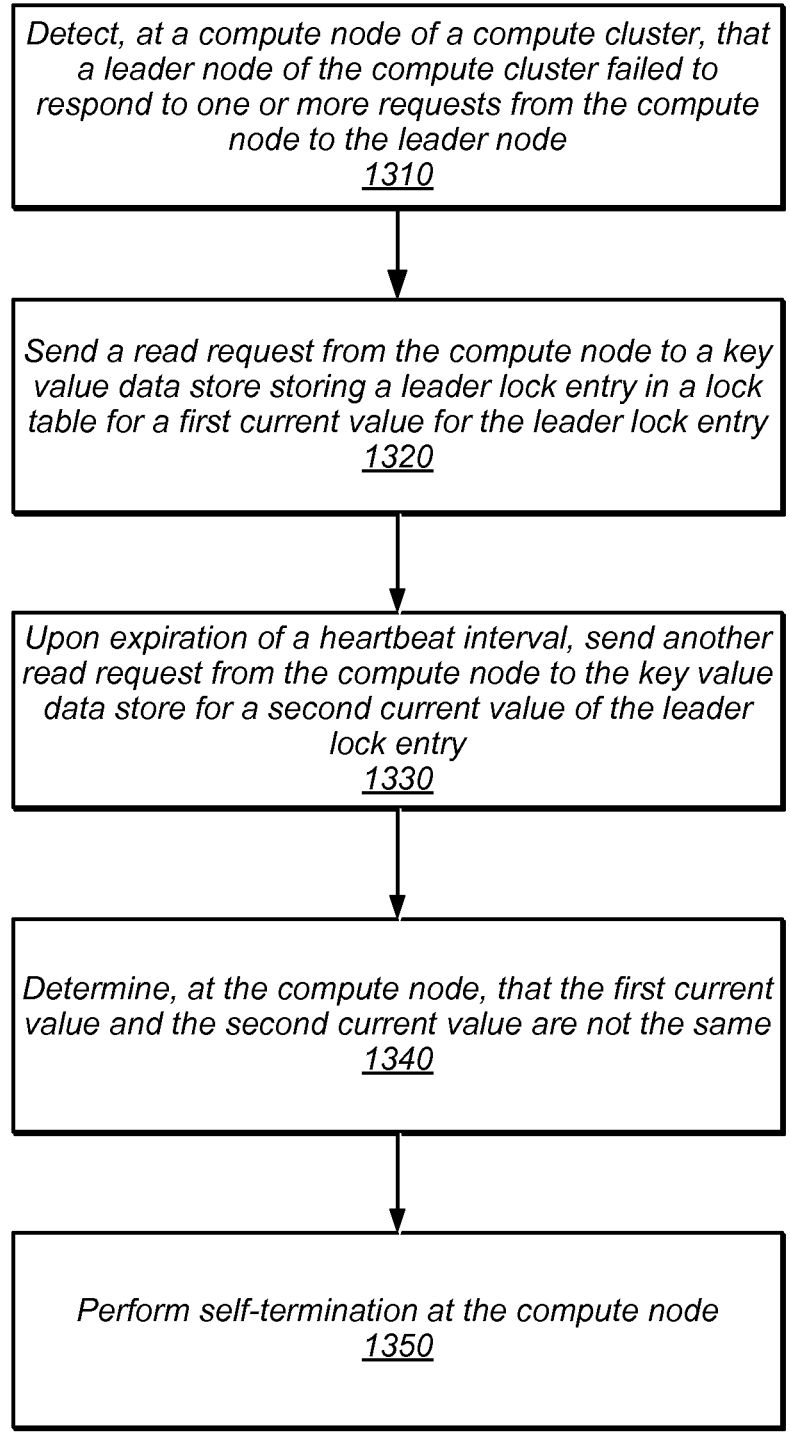
FIG. 13 is a high-level flowchart illustrating a method for determining that a leader node is available using distributed lock management in order for a compute node to perform a corrective action, according to some embodiments.

Compute nodes may also implement various techniques to determine whether or not a compute node (or a leader node) is in an erroneous state, and perform a corrective action. FIG. 13 is a high-level flowchart illustrating a method for determining that leader node is available using distributed lock management at compute node in order for a compute node to perform a corrective action, according to some embodiments. As indicated at 1310, the failure of a leader node of a compute cluster to respond to one or more requests from a compute node to the leader node may be detected, in some embodiments. For example, various operational requests to a leader node may timeout, or the leader node may send back one or more error messages which fail to respond to a request messages sent from a compute node.

In response to detecting the failure of the leader node to respond, a read request may be sent from the compute node to a key value data store storing a leader lock entry in a lock table for a first current value for the leader lock entry, as indicated at 1320. As discussed above with regard to FIGS. 1, 5A, 7A, and 11, a compute node, such as leader node, holding a lock may periodically or aperiodically update the lock entry with different unique entries. These unique entries may include a GUID, a monotonically increasing number, or a unique combination of multiple values in the leader lock entry. As indicated at 1330, upon expiration of a heartbeat interval (which may be standard lease period, or a period indicated in the lock leader entry which compute nodes may read), another read request may be sent to the key value data store for a second current value of the leader lock entry. If it is determined, at the compute node that the first current value and the second current value are not the same, as indicate at 1340, then the compute node may determine that the leader node is operating correctly. In some embodiments, the compute node may perform self-termination, as indicated at 1350. Alternatively, the compute node may send a conditional write request upon expiration of a heartbeat interval after the first read request (1320), which if failed to complete successfully, may indicate to the compute node that the leader is still actively renewing the lock (which again may cause or instigate self-termination of the compute node). As a result of the compute node's termination, the leader node, or some other cluster management system, may be allowed to instantiate a new compute node that may be able communicate with the leader node without error.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 14:
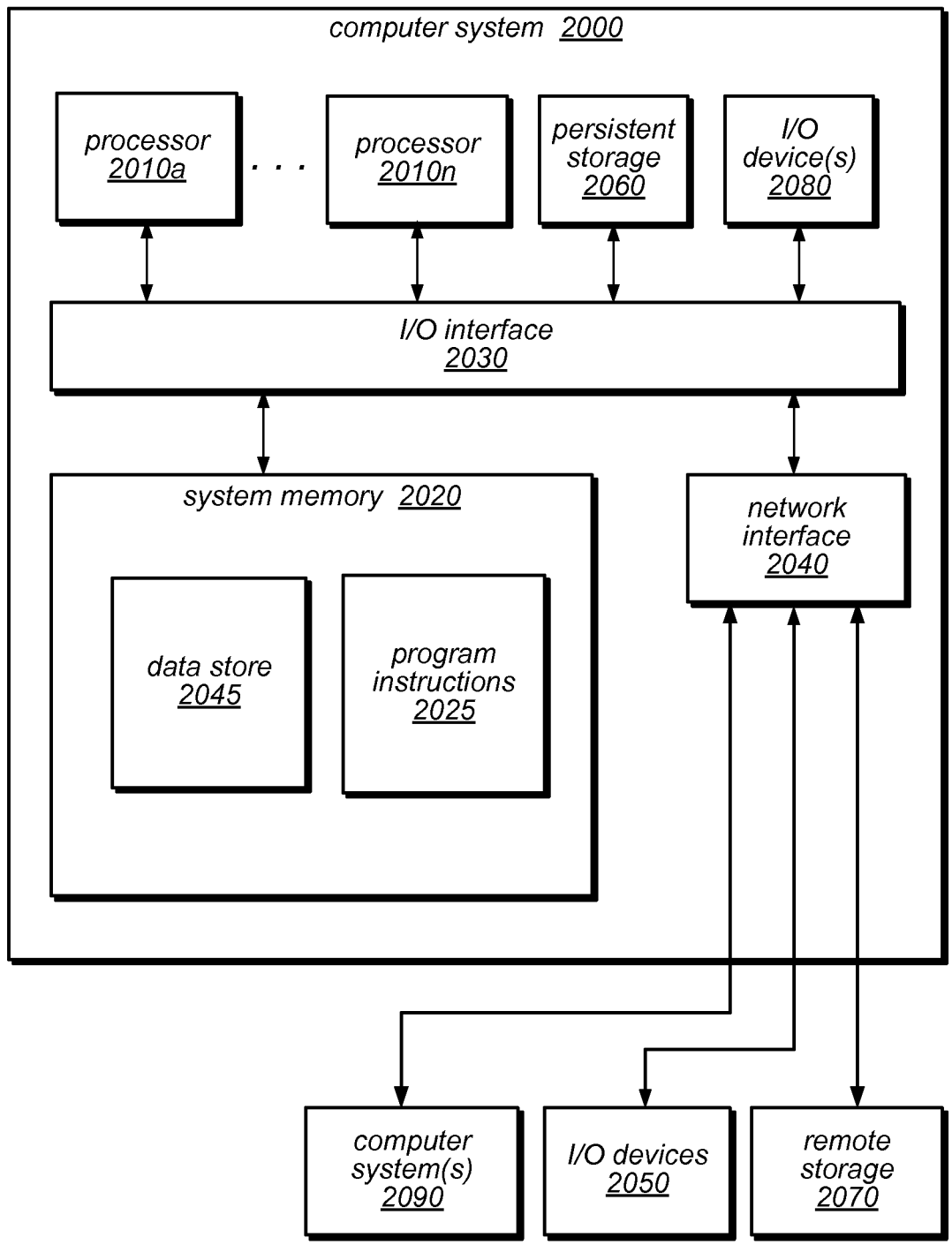
FIG. 14 is a block diagram illustrating an example computing system, according to some embodiments.

Embodiments of implementing distributed lock management using conditional updates to a distributed key value data store as described herein may be executed on one or more computer systems, which may interact with various other devices. FIG. 14 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the data warehouse system described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a storage client, data warehouse cluster leader or compute node, or various components or nodes of a storage system, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more compute nodes, storage nodes, and/or clients of the systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 14 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a key value data store, wherein the key value data store is a network-based service accessible by a plurality of compute nodes via a network, wherein the network-based service maintains data in a plurality of storage nodes according to a distributed durability scheme among the plurality of storage nodes, wherein the key value data store is configured to perform conditional write requests for updates to data stored at the key value data store, and wherein to provide access by the plurality of compute nodes to the network-based service the network implements internet-based communication protocols or comprises switches or routers configured to establish communication between the plurality of compute nodes and the network based service;

a compute cluster, comprising the plurality of compute nodes, wherein each of the compute nodes implements a respective distributed lock manager module, and wherein the network is accessible by compute nodes other than those of the compute cluster;

the respective distributed lock manager module of each compute node of the compute cluster, configured to:
- determine that a particular lock is available for the compute node based on a respective lock entry for the particular lock in a lock manager table maintained at the key value data store, wherein the lock manager table including the respective lock entry is replicated among the plurality of storage nodes of the key value data store according to the distributed durability scheme;
- in response to determining that the particular lock is available:
  - send a conditional write request to the key value data store to update the respective lock entry in the lock manager table in order to acquire the particular lock;
  - based, at least in part, on a response received from the key value data store, determine whether the conditional write request to the key value data store to update the respective lock entry in the lock manager table completed such that the compute node successfully acquired the particular lock; and
- in response to determining that the conditional write request to update the respective lock entry in the lock manager table completed:
  - periodically or aperiodically send a conditional write request to the key value data store to update the respective lock entry in the lock manager table for the compute cluster with a different unique entry value until the particular lock is to be released.

2. The system of claim 1, wherein, to determine that a particular lock is available for the compute node, the respective distributed lock manager of each compute node of the compute cluster is further configured to:
- send a read request to the key value data store to obtain a first current value for the respective lock entry in the lock manager table;
- upon expiration of a heartbeat interval, sending another read request to the key value data store to obtain a second current value for the respective lock entry in the lock manager table; and
- determine that the first current value for the respective lock entry is the same as the second current value for the respective lock entry in order to determine that the particular lock is available for acquisition.

3. The system of claim 1, wherein the key value data store comprises a leader node and a plurality of storage nodes to maintain the lock manager table, wherein the distributed durability scheme provides for leader node failover in order to elect a different leader node from among the plurality of storage nodes in the event of a failure of the leader node, wherein the leader node failover is implemented according to a different distributed lock manager accessible to the key value data store.

4. The system of claim 3, wherein the different distributed lock manager accessible to the key value data store is implemented according to a Paxos-based technique.

5. A method, comprising:
performing, by a plurality of computing devices:
- determining, at one or more compute nodes of a compute cluster comprising a plurality of compute nodes, that a particular lock is available based on a respective lock entry for the particular lock of one or more lock entries maintained in a lock manager table at a key value data store, wherein the key value data store is a network-based service accessible by the plurality of compute nodes via a network, wherein the network-based service maintains data in a plurality of storage nodes according to a distributed durability scheme, wherein the key value data store is configured to perform conditional write requests for updates to data stored at the key value data store, wherein to provide access by the plurality of compute nodes to the network-based service the network implements internet-based communication protocols or comprises switches or routers configured to establish communication between the plurality of compute nodes and the network based service, and wherein the network is accessible by other compute nodes other than the compute cluster;
- sending, from each of the one or more compute nodes of the plurality of compute nodes in the compute cluster, a conditional write request to the key value data store for the respective lock entry of the particular lock in order to acquire the lock for the compute node;
- identifying, at the compute cluster, a compute node of the one or more compute nodes that acquired the particular lock based on the respective lock entry for the particular lock, wherein the respective lock entry maintains an identity of the compute node of the one or more compute nodes that successfully completed the conditional write request, wherein other conditional write requests from other compute nodes of the one or more compute nodes to the key value data store for the respective lock entry failed to complete; and
- sending, from the compute node that acquired the particular lock, a conditional write request to the key value data store to update the respective lock entry with a different unique entry value in order to indicate that the particular lock is unavailable.

6. The method of claim 5,
wherein said determining, at the one or more compute nodes of the plurality of compute nodes comprising the compute cluster, that the particular lock is available, comprises:
- performing, by each of the one or more compute nodes of the plurality of compute nodes:
  - sending a read request to the key value data store to obtain a first current value for the respective lock entry in the lock manager table;
- wherein said sending the conditional write request to the key value data store for the respective lock entry of the particular lock from each of the one or more compute nodes is performed upon expiration of a heartbeat interval after obtaining the first current value for the respective lock entry, wherein the conditional write request includes the first current value for the respective lock entry as a value to be replaced with a different unique value in order to acquire the particular lock.

7. The method of claim 5, wherein said identifying, at the compute cluster, the compute node of the one or more compute nodes that acquired the particular lock is performed without implementing a Paxos-based protocol.

8. The method of claim 5, wherein a possessor of the particular lock operates as a leader node for the compute cluster, wherein said determining, said sending, and said identifying are performed as a leader election for the compute cluster to identify a new leader node.

9. The method of claim 8, wherein said identifying, at the compute cluster, the compute node of the one or more compute nodes that acquired the particular lock, comprises:
receiving, at the compute node, a write completion response from the key value data store indicating that the conditional write request for the respective lock entry completed.

10. The method of claim 9, wherein said identifying, at the compute cluster, the compute node of the one or more compute nodes that acquired the particular lock, further comprises:
receiving, at remaining ones of the one or more compute nodes different from the compute node, a write completion response from the key value data store indicating that the conditional write request for the respective lock entry failed to complete;
in response to receiving the write completion response from the key value data store indicating that the conditional write request for the respective lock entry failed to complete:
sending a read request to the key value data store for the particular lock; and
in response to receiving the particular lock entry, identifying the new leader node for the compute cluster based on the particular lock entry.

11. The method of claim 5, wherein the compute cluster is implemented as part of a network-based computational service.

12. A non-transitory, computer-readable storage medium, storing program instructions that when executed by a plurality of computing devices cause the plurality computing devices to implement:
determining, at one or more compute nodes of a compute cluster comprising a plurality of compute nodes, that a particular lock is available based on a respective lock entry for the particular lock of one or more lock entries maintained in a lock manager table at a key value data store, wherein the key value data store is a network-based service accessible by the plurality of compute nodes via a network, wherein the network-based service maintains data in a plurality of storage nodes according to a distributed durability scheme, wherein the key value data store is configured to perform conditional write requests for updates to data stored at the key value data store, wherein to provide access by the plurality of compute nodes to the network-based service the network implements internet-based communication protocols or comprises switches or routers configured to establish communication between the plurality of compute nodes and the network based service, and wherein the network is accessible by compute nodes other than those of the compute cluster;
sending, from each of the one or more compute nodes of the plurality of compute nodes in the compute cluster, a conditional write request to the key value data store for the respective lock entry of the particular lock in order to acquire the lock for the compute node;
identifying, at the compute cluster, a compute node of the one or more compute nodes that acquired the particular lock based on the respective lock entry for the particular lock, wherein the respective lock entry maintains an identity of the compute node of the one or more compute nodes that successfully completed the conditional write request, wherein other conditional write requests from other compute nodes of the one or more compute nodes to the key value data store for the respective lock entry failed to complete; and
sending, from the compute node that acquired the particular lock, a conditional write request to the key value data store to update the respective lock entry with a different unique entry value in order to indicate that the particular lock is unavailable.

13. The non-transitory, computer-readable storage medium of claim 12, wherein, in said determining, at the one or more compute nodes of the plurality of compute nodes comprising the compute cluster, that the particular lock is available, the program instructions further cause the plurality of computing devices to implement:
performing, by each of the one or more compute nodes of the plurality of compute nodes:
sending a read request to the key value data store to obtain a first current value for the respective lock entry in the lock manager table;
upon expiration of a heartbeat interval, sending another read request to key value data store to obtain a second current value for the respective lock entry in the lock manager table; and
determining that the first current value for the respective lock entry is the same as the second current value for the respective lock entry in order to determine that the particular lock is available for acquisition.

14. The non-transitory, computer-readable storage medium of claim 12, wherein a possessor of the particular lock operates as a leader node for the compute cluster, wherein said determining, said sending, and said identifying are performed as a leader election for the compute cluster in order to identify a new leader node, and wherein, in said identifying, at the compute cluster, the compute node of the one or more compute nodes that acquired the particular lock, the program instructions further cause the plurality of computing devices to implement:
receiving, at the compute node, a write completion response from the key value data store indicating that the conditional write request for the respective lock entry completed;
receiving, at remaining ones of the one or more compute nodes different from the compute node, a write completion response from the key value data store indicating that the conditional write request for the respective lock entry failed to complete;
in response to receiving the write completion response from the key value data store indicating that the conditional write request for the respective lock entry failed to complete:
sending a read request to the key value data store for the particular lock entry; and
in response to receiving the particular lock entry, identifying a new leader node for the compute cluster based on the particular lock entry.

15. The non-transitory, computer-readable storage medium of claim 14, wherein the program instructions further cause the plurality of computing devices to implement:

sending, from the new leader node, another read request to the data store for the particular lock entry; and
based, at least in part, on a value in the particular lock entry received at the leader node in response to the other read request, ceasing periodically sending a conditional write request from the new leader node to the key value data store to update the particular lock entry in the lock manager table for the compute cluster with a unique entry value in order to indicate that the particular lock identifying the new leader node for the compute cluster is available.

16. The non-transitory, computer-readable storage medium of claim 14, wherein the program instructions further cause the plurality of computing devices to implement:

determining, at the new leader node, that different nodes of the compute cluster are unavailable such that available compute nodes of the compute cluster are insufficient to satisfy a quorum requirement for the compute cluster; and
ceasing, at the new leader node, periodically sending a conditional write request from the new leader node to the key value data store to update the particular lock entry in the lock manager table for the compute cluster with a unique entry value in order to indicate that the particular lock identifying the new leader node for the compute cluster is available.

17. The non-transitory, computer-readable storage medium of claim 14, wherein the program instructions further cause the plurality of computing devices to implement:

detecting, at another compute node of the compute cluster, that the new leader node of the compute cluster failed to respond to one or more requests sent from the compute node to the leader node;
sending, from the other compute node, a read request to the key value data store to obtain a first current value for the particular lock entry in the lock manager table;
upon expiration of a heartbeat interval, sending another read request from the other compute node to the key value data store to obtain a second current value for the particular lock entry in the lock manager table;
determining that the first current value for the particular lock entry is not the same as the second current value for the particular lock entry in order to determine that the particular lock is unavailable; and
in response to determining that the particular lock is unavailable, performing self-termination at the other compute node.

18. The non-transitory, computer-readable storage medium of claim 12, wherein the key value data store is implemented as a multi-tenant, network-based storage service.

* * * * *